US010311106B2

(12) United States Patent
Chrapko et al.

(10) Patent No.: US 10,311,106 B2
(45) Date of Patent: Jun. 4, 2019

(54) SOCIAL GRAPH VISUALIZATION AND USER INTERFACE

(75) Inventors: Evan V Chrapko, Edmonton (CA); Leo M. Chan, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 825 days.

(21) Appl. No.: 14/368,725

(22) PCT Filed: Dec. 28, 2011

(86) PCT No.: PCT/CA2011/050809
§ 371 (c)(1),
(2), (4) Date: Oct. 2, 2014

(87) PCT Pub. No.: WO2013/097026
PCT Pub. Date: Jul. 4, 2013

(65) Prior Publication Data
US 2015/0026120 A1    Jan. 22, 2015

(51) Int. Cl.
*G06F 17/30* (2006.01)
*G06F 16/904* (2019.01)
(Continued)

(52) U.S. Cl.
CPC ........ *G06F 16/904* (2019.01); *G06F 16/9024* (2019.01); *G06N 5/048* (2013.01); *G06Q 50/01* (2013.01); *H04L 51/32* (2013.01)

(58) Field of Classification Search
CPC ............................ G06F 16/904; G06F 16/9024
See application file for complete search history.

(56) References Cited

U.S. PATENT DOCUMENTS 6,108,308 A     8/2000  Flavin et al.
6,356,902 B1    3/2002  Tan et al.
(Continued)

FOREIGN PATENT DOCUMENTS

CA     2600344 A1    9/2006
CA     2775899 A1    4/2011
(Continued)

OTHER PUBLICATIONS

Mariusz et al., "Reconstruction of a Social Network Graph from Incomplete Call Detail Records," Conf. Proc. of the International Conf. on Computational Aspects of Social Networks (CASoN), XP032027959, pp. 136-140 (Oct. 19, 2011).
(Continued)

*Primary Examiner* — Robert W Beausoliel, Jr.
(74) *Attorney, Agent, or Firm* — Amin, Turocy & Watson, LLP

(57) ABSTRACT

Systems and methods for visualizing trust scores in a social graph are described herein. The trust scores may be determined within or between individuals, groups, and/or entities connected in a network. A user may initiate the visualization of connections between themselves and others in the network. Contacts are selected for the visualization of the social graph, and a spatial distribution of the nodes is calculated. Nodes in the visualization of the social graph are rendered based on the calculated spatial distribution. Connections between the nodes may be rendered based on connectivity statistics calculated between the rendered nodes.

36 Claims, 22 Drawing Sheets

(51) Int. Cl.
  *G06F 16/901* (2019.01)
  *G06Q 50/00* (2012.01)
  *G06N 5/04* (2006.01)
  *H04L 12/58* (2006.01)

(56) References Cited

U.S. PATENT DOCUMENTS

| | | |
|---|---|---|
| 6,446,048 B1 | 9/2002 | Wells et al. |
| 6,509,898 B2 | 1/2003 | Chi et al. |
| 6,633,886 B1 | 10/2003 | Chong |
| 6,708,308 B2 | 3/2004 | De Souza et al. |
| 6,738,777 B2 | 5/2004 | Bliss et al. |
| 6,823,299 B1 | 11/2004 | Contreras et al. |
| 7,086,085 B1 | 8/2006 | Brown et al. |
| 7,130,262 B1 | 10/2006 | Cortez et al. |
| 7,130,908 B1 | 10/2006 | Pecus et al. |
| 7,266,649 B2 | 9/2007 | Yoshida et al. |
| 7,451,365 B2 | 11/2008 | Wang et al. |
| 7,512,612 B1 | 3/2009 | Akella et al. |
| 7,539,697 B1 | 5/2009 | Akella et al. |
| 7,664,802 B2 | 2/2010 | Aaltonen et al. |
| 7,668,665 B2 | 2/2010 | Kim |
| 7,685,192 B1 | 3/2010 | Scofield et al. |
| 7,743,208 B2 | 6/2010 | Yoshida et al. |
| 7,822,631 B1 | 10/2010 | Vander Mey et al. |
| 8,010,458 B2 | 8/2011 | Galbreath et al. |
| 8,108,536 B1 | 1/2012 | Hernacki et al. |
| 8,156,558 B2 | 4/2012 | Goldfeder et al. |
| 8,180,804 B1 | 5/2012 | Narayanan et al. |
| 8,214,883 B2 | 7/2012 | Obasanjo et al. |
| 8,261,078 B2 | 9/2012 | Barriga et al. |
| 8,301,617 B2 | 10/2012 | Muntz et al. |
| 8,316,056 B2 | 11/2012 | Wable |
| 8,392,590 B2 | 3/2013 | Bouchard et al. |
| 8,468,103 B2 | 6/2013 | Galbreath et al. |
| 8,516,196 B2 | 8/2013 | Jain et al. |
| 8,572,129 B1 | 10/2013 | Lee et al. |
| 8,601,025 B1 | 12/2013 | Shajenko et al. |
| 8,682,837 B2 | 3/2014 | Skelton |
| 8,683,423 B2 | 3/2014 | Amaral et al. |
| 9,223,978 B2 | 12/2015 | Kraemer |
| 9,390,243 B2 | 7/2016 | Dhillon et al. |
| 2003/0133411 A1 | 7/2003 | Ise et al. |
| 2003/0227924 A1 | 12/2003 | Kodialam et al. |
| 2004/0018518 A1 | 1/2004 | Krieb et al. |
| 2004/0088147 A1 | 5/2004 | Wang et al. |
| 2004/0122803 A1 | 6/2004 | Dom et al. |
| 2004/0181461 A1 | 9/2004 | Raiyani et al. |
| 2004/0239674 A1 | 12/2004 | Ewald et al. |
| 2005/0055639 A1* | 3/2005 | Fogg ............... G06Q 10/10 715/262 |
| 2005/0096987 A1 | 5/2005 | Miyauchi |
| 2005/0243736 A1 | 11/2005 | Faloutsos et al. |
| 2006/0271564 A1 | 11/2006 | Meng Muntz et al. |
| 2006/0287842 A1 | 12/2006 | Kim |
| 2006/0290697 A1 | 12/2006 | Madden et al. |
| 2007/0109302 A1 | 5/2007 | Tsuboshita et al. |
| 2007/0143281 A1* | 6/2007 | Smirin ............... G06F 17/30867 |
| 2007/0214259 A1 | 9/2007 | Ahmed et al. |
| 2007/0220146 A1 | 9/2007 | Suzuki |
| 2007/0282886 A1 | 12/2007 | Purang et al. |
| 2008/0015916 A1 | 1/2008 | Cossey et al. |
| 2008/0086442 A1 | 4/2008 | Dasdan et al. |
| 2008/0104225 A1 | 5/2008 | Zhang et al. |
| 2008/0133391 A1 | 6/2008 | Kurian et al. |
| 2008/0183378 A1 | 7/2008 | Weidner |
| 2008/0316925 A1* | 12/2008 | Dolin ............... G06Q 30/02 370/232 |
| 2009/0024629 A1 | 1/2009 | Miyauchi |
| 2009/0027392 A1 | 1/2009 | Jadhav et al. |
| 2009/0043489 A1 | 2/2009 | Weidner |
| 2009/0064293 A1 | 3/2009 | Li et al. |
| 2009/0106822 A1 | 4/2009 | Obasanjo et al. |
| 2009/0198562 A1 | 8/2009 | Wiesinger et al. |
| 2009/0296568 A1 | 12/2009 | Kitada |
| 2010/0004940 A1 | 1/2010 | Choi et al. |
| 2010/0010826 A1 | 1/2010 | Rosenthal et al. |
| 2010/0076987 A1 | 3/2010 | Schreiner |
| 2010/0180048 A1 | 7/2010 | Guo et al. |
| 2010/0250605 A1 | 9/2010 | Pamu et al. |
| 2010/0274815 A1 | 10/2010 | Vanasco |
| 2010/0309915 A1 | 12/2010 | Pirbhai et al. |
| 2011/0173344 A1 | 7/2011 | Mihaly et al. |
| 2011/0246237 A1 | 10/2011 | Vdovjak |
| 2011/0246412 A1 | 10/2011 | Skelton |
| 2011/0265011 A1 | 10/2011 | Taylor et al. |
| 2011/0283205 A1 | 11/2011 | Nie et al. |
| 2011/0295626 A1 | 12/2011 | Chen et al. |
| 2012/0182882 A1 | 7/2012 | Chrapko et al. |
| 2012/0278625 A1* | 11/2012 | Narayanan ............... H04L 9/006 713/175 |
| 2012/0282884 A1 | 11/2012 | Sun |
| 2012/0317149 A1 | 12/2012 | Jagota et al. |
| 2012/0317200 A1 | 12/2012 | Chan |
| 2013/0013807 A1 | 1/2013 | Chrapko et al. |
| 2013/0046824 A1* | 2/2013 | Park ............... G06Q 50/01 709/204 |
| 2013/0117688 A1* | 5/2013 | Yerli ............... G06Q 50/01 715/751 |
| 2013/0166601 A1 | 6/2013 | Chrapko et al. |
| 2013/0173457 A1 | 7/2013 | Chrapko et al. |
| 2013/0332740 A1 | 12/2013 | Sauve et al. |
| 2014/0089189 A1 | 3/2014 | Vasireddy et al. |
| 2014/0156274 A1 | 6/2014 | You et al. |
| 2014/0172708 A1 | 6/2014 | Chrapko et al. |
| 2014/0287725 A1 | 9/2014 | Lee |
| 2015/0026120 A1 | 1/2015 | Chrapko et al. |

FOREIGN PATENT DOCUMENTS

| | | |
|---|---|---|
| EP | 1511232 A1 | 3/2005 |
| JP | 2001-298453 A | 10/2001 |
| JP | 2003-259070 A | 9/2003 |
| JP | 2006-260099 A | 9/2006 |
| JP | 2008-129990 A | 6/2008 |
| WO | WO-2009002193 | 12/2008 |
| WO | WO-2009020964 | 2/2009 |
| WO | WO-2009109009 | 9/2009 |
| WO | WO-2010/048172 A1 | 4/2010 |
| WO | WO-2011/143761 A1 | 11/2011 |
| WO | WO2013026095 | 2/2013 |

OTHER PUBLICATIONS

Kim, Jung-Tae et al., "Design and Implementation of the Location-based Personalized Social Media Service," Conf. Proc. of the International Conf. on Internet and Web Applications and Services (ICIW), XP031683897, pp. 116-121 (May 9, 2010).

Geisberger et al., "Contraction Hierarchies: Faster and Simpler Hierarchical Routing in Road Networks," LNCS 5038:319-333 (2008).

Angwin et al, "'Scrapers' Dig Deep for Data on Web", http://online.wsj.com/article/SB10001424052748703358504575544381288117888.html?mod=dje malertNEWS, Oct. 12, 2010, printed Nov. 6, 2010, 5 pages.

* cited by examiner

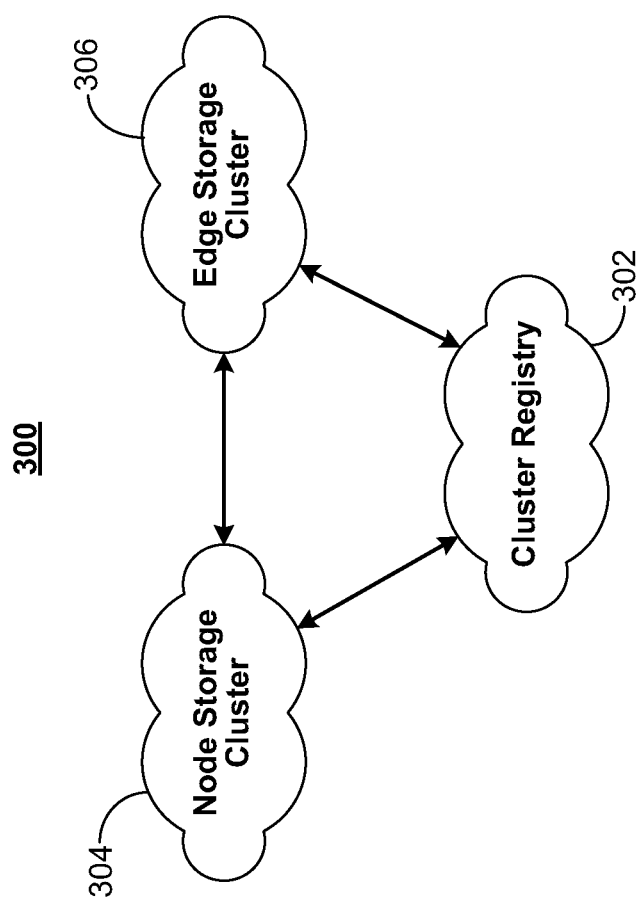

400

402

| Cluster_Info Table | |
|---|---|
| Cluster_Id | Integer |
| Cluster_Type | Varchar |

404

| Registry_Cache Table | |
|---|---|
| Cluster_Id | Integer |
| Machine | Varchar |

FIG. 4A

410
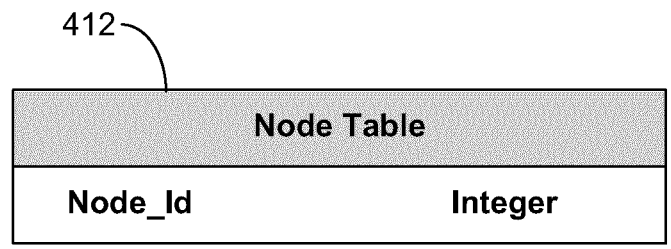
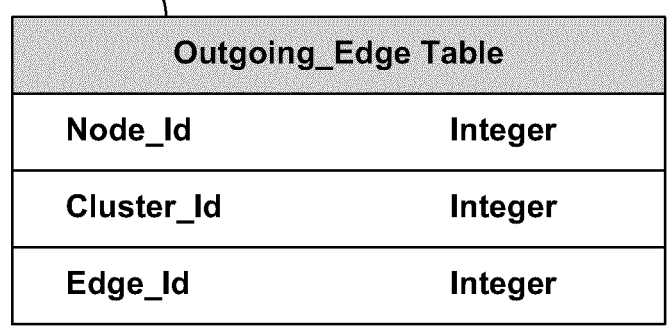
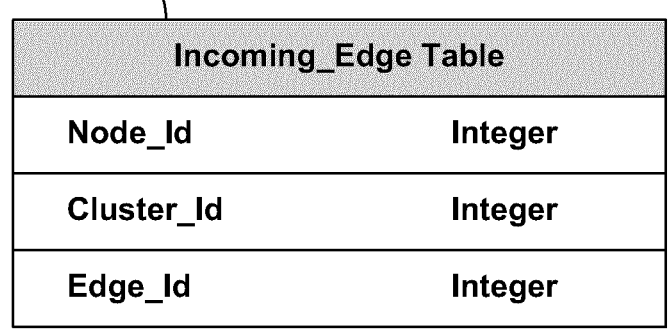
FIG. 4B

SOCIAL GRAPH VISUALIZATION AND USER INTERFACE

REFERENCE TO RELATED APPLICATIONS

This application is a United States National Stage Application filing under 35 U.S.C. § 371 of International Application No. PCT/CA11/050809 filed on Dec. 28, 2011. The prior application is incorporated herein in its entirety. International Application No. PCT/CA11/050809 was published under PCT Article 21(2) in English.

BACKGROUND OF THE INVENTION

This invention relates generally to visualizations of networks of individuals, entities, and network communities, and more particularly to systems and methods for visualizing trust scores within or between individuals or entities or networks of individuals or entities.

A graph is a set of nodes and edges between them. Visualizations of graphs may include depictions of the nodes using circles of a fixed radius, while the edges may be depicted as lines connecting the nodes. Each member in the network community may be represented by a node, and the connections between the members of the network community may be represented by edges connecting the nodes. Relationship data associated with the nodes may possess varying degrees of connectivity information about the member itself and possibly about other members or contacts in the community. Some of this information may be highly credible or objective (e.g., "I trust Seller Sally because she has positive feedback from 90% of the other members of the network community"), while other information may be less credible and subjective (e.g., "I trust Seller Sally because she posts beautiful pictures of her homemade ceramic figures").

The term "social graph" as used herein refers to a mapping of relationships between individuals or entities using standard graph concepts. A social graph describes relationships in the real world, as well as in online communities that may have no real world equivalent.

Depicting and interacting with such graphs in a meaningful way is challenging. For example, if a network community includes hundreds or thousands of members, then a visualization of the connections between members of that network community may contain so many edge crossings that the exact lines in the visualization become "blacked out". In addition, it is difficult for visualizations of network communities to depict how prominent or connected individual members of the network community are. For example, uniform depiction of nodes and associated edges (e.g., depictions of nodes with uniform size), because they fail to convey an individual or entity's importance within a network community.

In addition, visualizations of network communities may be difficult to achieve computationally. In one example, calculating the connectivity between each node in a network community may require numerous resource intensive calculations. In another example, visualizing connections between the nodes in a community may require calculation of each possible path between every pair of nodes in the graph. Further, minimizing edge crossings in rendering such paths may require comparisons of each edge with every other edge. These computations may result in a slow rendering of the graph on certain kinds of hardware, such as smartphones.

SUMMARY OF THE INVENTION

In view of the foregoing, systems and methods are provided for visualizing relationship data, such as connectivity information, associated with nodes within a network community. The visualizations are rendered such that a user viewing or interacting with the visualization can gain meaningful information about their relationship with other contacts in the network community. In order to solve this problem, methods and systems are described to determine what social network contacts are selected for the visualization of a social graph, determine the spatial layout of nodes in a visualization of a social graph, and render the appearance of the visualization of a social graph itself.

Connectivity may be determined, at least in part, using various graph traversal and normalization techniques described in more detail below and in U.S. Provisional Patent Application Nos. 61/247,343, filed Sep. 30, 2009, 61/254,313, filed Oct. 23, 2009, 61/294,949, filed Jan. 14, 2010, 61/310,844, filed Mar. 5, 2010, 61/329,899, filed Apr. 30, 2010, and 61/383,583, filed Sep. 16, 2010, and in International Patent Application Nos. CA2010001531, filed Sep. 30, 2010, CA2010001658, filed Oct. 22, 2010, CA2011050017, filed Jan. 14, 2011, CA2011050125 filed Mar. 3, 2011, and CA201150569, filed Sep. 16, 2011, each of which are hereby incorporated by reference herein in their entireties.

In an embodiment, a path counting approach may be used where processing circuitry is configured to count the number of paths between a first node $n_1$ and a second node $n_2$ within a network community. A connectivity rating $R_{n_1 n_2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user (i.e., the out-link values). If $t_i$ is the user connectivity value assigned to link i, then the relative user weight, $w_i$ assigned to that link may be given in accordance with:

$$w_i = 1 + (t_i - \bar{t}_i)^2 \qquad (1)$$

In some embodiments, an alternative relative user weight, $w_i'$, may be used based on the number of standard deviations, $\sigma$, the user connectivity value differs from the average value assigned by that user or node. For example, the alternative relative user weight may be given in accordance with:

$$w_i' = 1 - \frac{1}{2+k^2} \text{ where } k = \begin{cases} 0, \text{ if } \sigma = 0 \\ \frac{t_i - \bar{t}_i}{\sigma}, \text{ otherwise} \end{cases} \qquad (2)$$

To determine the overall weight of a path, in some embodiments, the weights of all the links along the path may be multiplied together. The overall path weight may then be given in accordance with:

$$w_{path} = \Pi(w_i) \quad (3)$$

or $$w_{path} = \Pi(w_i') \quad (4)$$

The connectivity value for the path may then be defined as the minimum user connectivity value of all the links in the path multiplied by the overall path weight in accordance with:

$$t_{path} = w_{path} \times t_{min} \quad (5)$$

In some embodiments, the connectivity or trust rating between two nodes may be based on connectivity statistics values for one of the nodes. The connectivity rating or trust rating a first node has for a second node may be based on connectivity between the first node and the second node and one or more connectivity statistics associated with the first node.

In other embodiments, only "qualified" paths may be used to determine connectivity values. A qualified path may be a path whose path weight meets any suitable predefined or dynamic criteria. For example, a qualified path may be a path whose path weight is greater than or equal to some threshold value. As described in more detail below, any suitable threshold function may be used to define threshold values. The threshold function may be based, at least in some embodiments, on empirical data, desired path keep percentages, or both. In some embodiments, threshold values may depend on the length, l, of the path. For example, an illustrative threshold function specifying the minimum path weight for path p may be given in accordance with:

$$\text{threshold}(p) = \begin{cases} 0.5, & \text{if } l = 1 \\ 0.428, & \text{if } l = 2 \\ 0.289, & \text{if } l = 3 \\ 0.220, & \text{if } l = 4 \\ 0.216, & \text{if } l = 5 \\ 0.192, & \text{if } l = 6 \end{cases} \quad (6)$$

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold (or above a maximum threshold) may be ignored in a connectivity determination or connectivity computation, while only weights of sufficient magnitude may be considered.

In some embodiments, a user connectivity or trust value may represent the degree of trust between a first node and a second node. In one embodiment, node $n_1$ may assign a user connectivity value of $l_1$ to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. For example, one or more of the individual or entity's reputation within the network community (or some other community), the individual or entity's alignment with the trusting party (e.g., political, social, or religious alignment), past dealings with the individual or entity, and the individual or entity's character and integrity (or any other relevant considerations) may be used to determine a partially subjective user connectivity value indicative of trust. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

In other embodiments, the user connectivity or trust value may be calculated objectively. In one embodiment, the trust value of a first node for a second node may be calculated based on the number of paths linking the two nodes, one or more path scores associated with the linking paths, connectivity statistics and/or other connectivity information associated with the first node.

In some embodiments, connectivity values may be used to present information to the user. In an embodiment, a visualization of a network graph may be used to represent relationship data, such as connectivity values, between a user and other contacts in that user's social graph. The relationship data associated with a user may be retrieved and stored based on social network credentials that the user provides, such as login credentials for Facebook. Contacts for the visualization are selected for the social graph based on the relationship data. For example, contacts for the visualization may be selected based on the degree of separation between the user and other contacts in the user's social network, connectivity values associated with the user and other contacts in the user's social network, or both. The spatial distribution of nodes associated with the contacts that are selected for the visualization may be calculated based on a measure of fitness. Measures of fitness can include the area that a node or group of nodes will occupy in a particular portion of the visualization of the social graph. Nodes that represent the selected contacts are rendered based on the calculated spatial distribution.

In an embodiment, a user may initiate the visualization of connections between themselves and others in a network community or communities by selecting a first and second contact in one or more social networks. These contacts may be selected by interacting with an existing rendering of a visualization of a social graph, or may occur before any components of the visualization are rendered. In an embodiment, a user selects a first contact in a social network as a "target" node. After selection of the first node, contacts for the visualization of the social graph may be selected based on the degrees of separation from the user and the first contact. The visualization of the social graph is then rendered based on the selected contacts.

In an embodiment, a user selects a second contact in a social network as an "intermediate" node. Connectivity information (e.g., trust scores) may be calculated between each of the rendered nodes. The shortest path between the user and the first selected contact that includes the intermediate contact may be calculated based on the connectivity information. Lines are then rendered to represent the calculated shortest path. The resulting visualization provides the user with information regarding a path between the user and a "target" node that has a high amount of connectivity between the nodes in the path. In one example, this visualization may be useful to the user in that it shows them the best way to be socially introduced to the target node. In addition, selection of the intermediate node In an embodiment, the nodes may be rendered in such a way that their visual appearance itself conveys useful information to the viewer. For example, trust scores may be calculated between each of the nodes in an initial visualization of a social graph, and for each node a sum of a subset of those trust scores may be calculated. This sum may indicate how trustworthy or prominent a particular contact is within a network community. Accordingly, the visual appearance of a node associated with a highly trustworthy or prominent contact may be rendered differently than the visual appearance of a less trustworthy or prominent contact. For example, a node may be rendered with a radius directly proportional to the magnitude of the sum of the subset of the trust scores calculated for that node.

In some embodiments, users may be allowed to adjust aspects of a visualization of a social graph, such as the size or positioning of a node in the visualization. Data (e.g., connectivity data) associated with the node may then be updated based on these adjustments. The visualization of the social graph may then be rerendered based on these adjustments.

In some embodiments, the contacts in the visualization of the social graph may be directly connected to the user. For example, the contacts in the social graph visualization may be Facebook friends or Twitter followers of the user. In some embodiments, the contacts in the visualization of the social graph may not be directly connected to the user. For example, the social graph visualization may include contacts that the user are not direct Facebook friends or Twitter followers. In some embodiments, the contacts in the visualization of the social graph may represent an individual human being, living or deceased. In some embodiments, a portion or all of the contacts in the visualization of the social graph may represent an individual human being, entity (e.g., a legal entity, such as a public or private company, corporation, limited liability company (LLC), partnership, sole proprietorship, or charitable organization), concept (e.g., a social networking group), service, animal, city/town/village, parcel of land (which may be identified by land descriptions), or inanimate object (e.g., a car, aircraft, or tool).

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 3 is an illustrative diagram of a distributed storage/computation network in accordance with one embodiment of the invention;

FIGS. 4A-C show illustrative data tables for graph information storage in a distributed storage/computation network in accordance with one embodiment of the invention;

DETAILED DESCRIPTION

Figure 1:
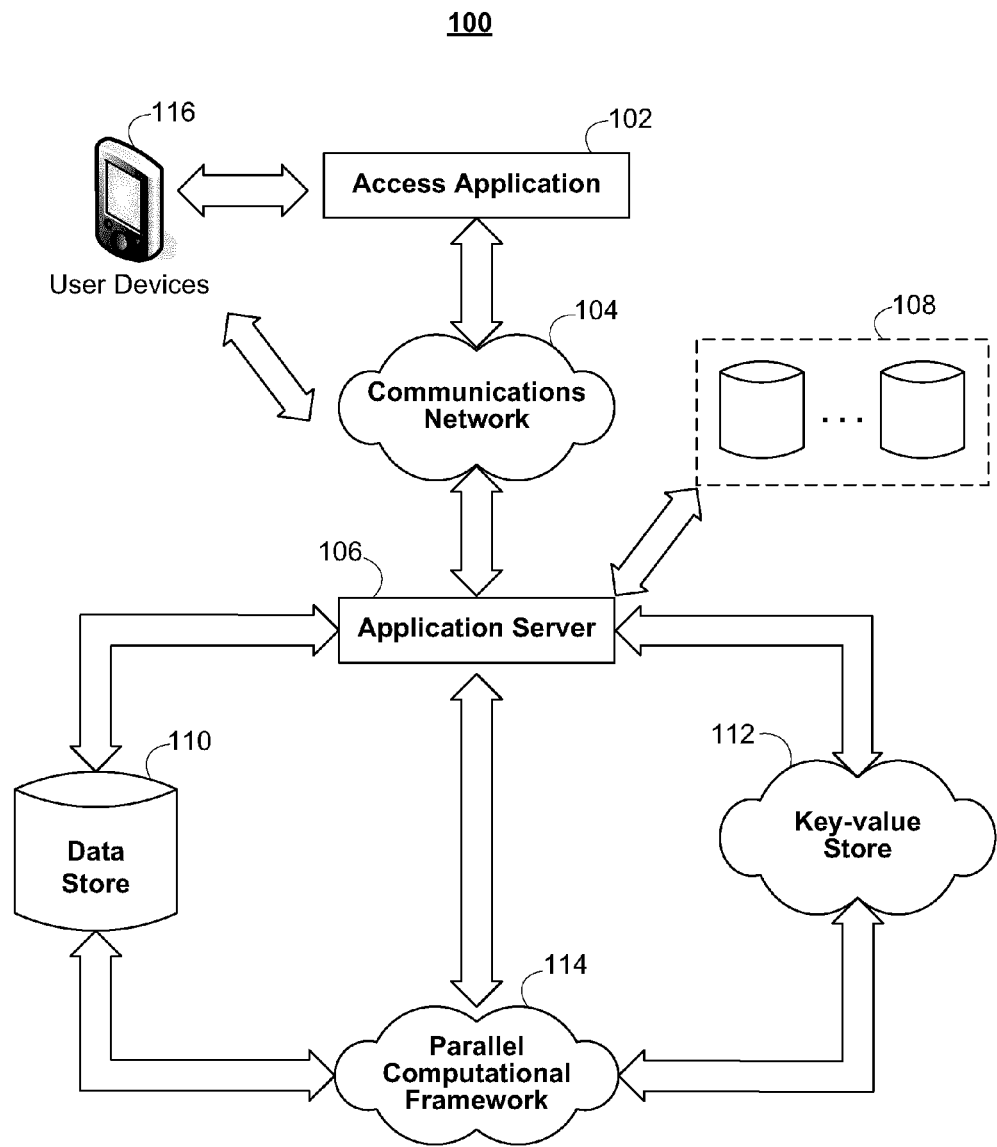
FIG. 1 is an illustrative block diagram of a network architecture used to support visualization of a network community in accordance with one embodiment of the invention.

Systems and methods for determining the connectivity between nodes in a network community are provided. As defined herein, a "node" may include any user terminal, network device, computer, mobile device, access point, robot, or any other electronic device capable of being uniquely identified within a network community. For example, nodes may include robots (or other machines) assigned unique serial numbers or network devices assigned unique network addresses. In some embodiments, a node may also represent an individual human being, entity (e.g., a legal entity, such as a public or private company, corporation, limited liability company (LLC), partnership, sole proprietorship, or charitable organization), concept (e.g., a social networking group), service, animal, city/town/village, parcel of land (which may be identified by land descriptions), or inanimate object (e.g., a car, aircraft, or tool). As also defined herein, a "network community" may include a collection of nodes and may represent any group of devices, individuals, or entities.

In an embodiment, all or some subset of the users of a social networking website or social networking service (or any other type of website or service, such as an online gaming community) may make up a single network community. A node in the network community may represent each user. As another example, all the subscribers to a particular newsgroup or distribution list may make up a single network community, where each individual subscriber may be represented by a node in the network community. Any particular node may belong in zero, one, or more than one network community, or a node may be banned from all, or a subset of, the community. To facilitate network community additions, deletions, and link changes, in some embodiments a network community may be represented by a directed graph, or digraph, weighted digraph, tree, or any other suitable data structure.

In an embodiment, any particular node may represent a contact in a network community that is directly connected to a particular user. For example, a particular node may be associated with a contact in a network community that the user is a Facebook friend of, a Twitter follower of, a first degree LinkedIn connection with, or that the user is directly with in the respective network community. In an embodiment, any particular node may represent a contact in a network community that is not directly connected to a particular user. In one example, a particular node may be associated with a contact in a network community that is a friend of a Facebook friend, a second degree LinkedIn connection, or any suitable indirectly connected contact in the respective network community. In another example, a particular node may be associated with a contact entirely outside of a network community. For example, a user could meet a business professional that they have no previously known ties to, and wish to incorporate that contact into a visualization of their social graph. In some embodiments, a user may formally add this previously unknown contact to their network community by, for example, sending the contact a friend request on Facebook or an invitation to connect on LinkedIn. In such embodiments, the visualization of the social graph associated with the network community may be updated through the process that will be described in greater detail with respect to FIG. 10. In other embodiments, a user may indicate that they wish to incorporate this previously unknown contact into the visualization of the social graph associated with the network community without adding them as a connection in their network community. In such embodiments, the visualization of the social graph associated with the network community may be updated through the process through the process that will be described in greater detail with respect to FIG. 10.

FIG. 1 shows illustrative network architecture 100 used to support the connectivity determinations within a network community. A user may utilize access application 102 to access application server 106 over communications network 104. For example, access application 102 may include a standard web browser, application server 106 may include a web server, and communication network 106 may include the Internet. Access application 102 may also include proprietary applications specifically developed for one or more platforms or devices. For example, access application 102 may include one or more instances of an Apple iOS, Android, WebOS, or any suitable application for use in accessing application server 106 over communications network 104. Multiple users may access application server 106 via one or more instances of access application 102. For example, one or more user devices 116 may each have an instance of access application 102 running locally on the devices. User devices 116 may include mobile devices such as laptop computers, cell phones (e.g., iPhone, Blackberry, or Android devices), tablet devices (e.g., iPads or Android tablet devices), or any suitable mobile device. User devices 116 may also include conventional computing equipment such as desktop personal computers, web servers, or any other suitable computing equipment. In an embodiment, one or more users may use an instance of access application 102 to interact with application server 106. In an embodiment, one or more user devices 116 may use an instance of access application 102 to interact with application server 106 to render a visualization of a social graph on a display screen of one or more user devices 116.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more microprocessors), memory (e.g., RAM, ROM, and hybrid types of memory), storage devices (e.g., hard drives, optical drives, and tape drives). The processing circuitry included in application server 106 may execute a server process for supporting the network connectivity determinations of the present invention, while access application 102 executes a corresponding client process. The processing circuitry included in application server 106 may also perform any of the calculations and computations described herein in connection with determining network connectivity. In some embodiments, a computer-readable medium with computer program logic recorded thereon is included within application server 106. The computer program logic may determine the connectivity between two or more nodes in a network community and it may or may not output such connectivity to a display screen or data store.

For example, application server 106 may access data sources 108 over the Internet, a secured private LAN, or any other communications network. Data sources 108 may include one or more third-party data sources, such as data from third-party social networking services third-party ratings bureaus, and document issuers (e.g., driver's license and license plate issuers, such as the Department of Motor Vehicles). For example, data sources 108 may include user and relationship data (e.g., "friend" or "follower" data) from one or more of Facebook, MySpace, openSocial, Friendster, Bebo, hi5, Orkut, PerfSpot, Yahoo! 360, Gmail, Yahoo! Mail, Hotmail, or other email based services and accounts, LinkedIn, Twitter, Google Buzz, Really Simple Syndication readers, or any other social networking website or information service. Data sources 108 may also include data stores and databases local to application server 106 containing relationship information about users accessing application server 106 via access application 102 (e.g., databases of addresses, legal records, transportation passenger lists, gambling patterns, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 300 (FIG. 5A) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table).

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster. In some embodiments, the parallel computational framework 114 may include a distributed storage/computation network, described below in relation to FIG. 3.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs. For each input key-value pair, the map task may invoke a user defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
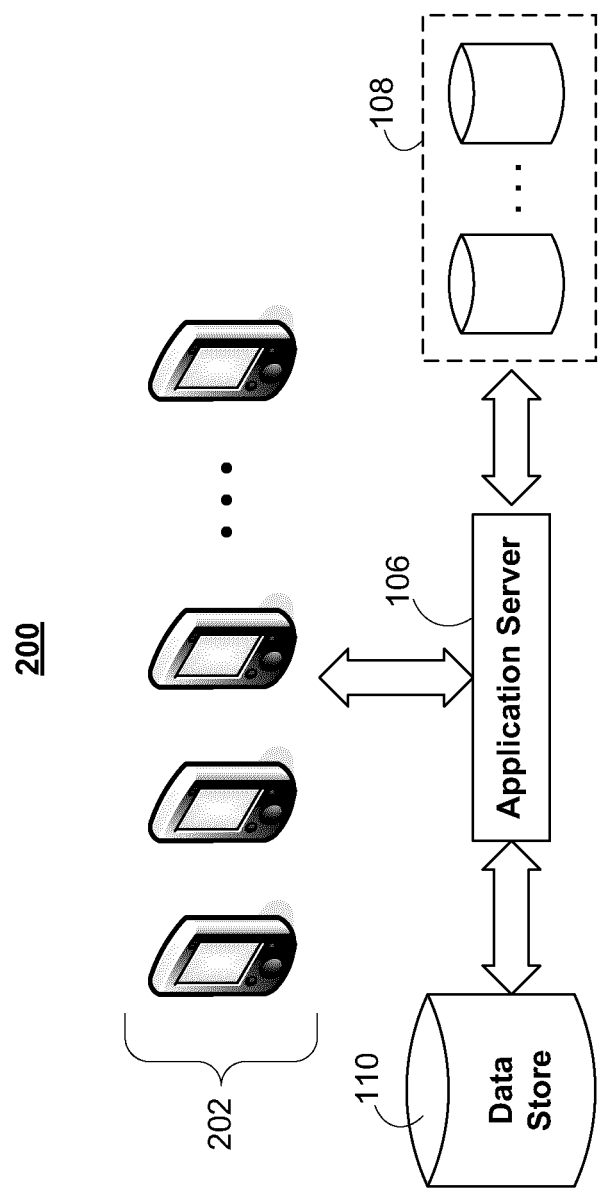
FIG. 2 is another illustrative block diagram of a network architecture used to support visualization of a network community in accordance with one embodiment of the invention.

Although FIG. 1, in order to not over-complicate the drawing, only shows a single instance of access application 102, communications network 104, application server 106, data source 108, data store 110, key-value store 112, and parallel computational framework 114, in practice network architecture 100 may include multiple instances of one or more of the foregoing components. In addition, key-value store 112 and parallel computational framework 114 may also be removed, in some embodiments. As shown in network architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially-configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

FIG. 3 is an illustrative diagram of a distributed storage/computation network 300 in accordance with one embodiment of the invention. The distributed network 300 may be used to store information about one or more network communities. In some embodiments, network community information may be stored in the distributed network 300 in the form of one or more graphs. The distributed network 300 may include a plurality of computers, processors, or devices, each of which may communicate with other computers in the network via a communications network such as a local area network, a wide area network, the Internet, any other suitable wired or wireless communications network, or any combination thereof. In some embodiments, the computers in the distributed network 300 may be grouped into one or more clusters, each with a unique cluster ID. In one embodiment, the computers in the distributed network 300 may be grouped into at least three clusters: a cluster registry 302, a node storage cluster 304, and an edge storage cluster 306. Each cluster may include one or more computers, processors, or devices, and in some embodiments, individual computers may be able to dynamically move between different clusters. For example, clusters may be scalable. Individual computers may also be able to leave or join the distributed network 300. For example, computers may be added to the distributed network 300 in order to increase storage and/or computing capacity. In some embodiments, each cluster may provide one or more services to one or more requesters, such as other computers or clusters in the distributed network 300, or a remote user or system.

In some embodiments, a cluster registry 302 may store information about all of the clusters in the distributed network 300 and/or all of the computers in the distributed network 300. In some embodiments, cluster registry may store information about any suitable subset of clusters in the distributed network 300 (e.g., any suitable one or more of such clusters). In some embodiments, the distributed network 300 may include only one cluster registry, but in other embodiments, the distributed network 300 may include two or more cluster registries. The information stored in the cluster registry 302 may also be cached on one or more other computers in the distributed network 300. For example, in one embodiment, every other computer in the distributed network 300 may cache the information stored in the cluster registry.

The cluster registry 302 may provide various services to requesters. Requesters may include other clusters or computers in the distributed network 300, or remote/external users and systems. Illustrative services that the cluster registry 302 may provide may include any combination of the following:

List all clusters—the cluster registry 302 provides a list of all of the clusters in the distributed network 300.

List all members of a cluster—the cluster registry 302 provides a list of computers, processors, or devices in a given cluster. This service may require a cluster ID to identify the given cluster, and may return a list of the network addresses (e.g., IP addresses) of the computers, processors, or devices in the identified cluster.

Create a cluster—the cluster registry 302 creates a new cluster with a new, unique cluster ID. In some embodiments, the requester of this service may be able to specify the new cluster ID or the computers in the new cluster. In other embodiments, the cluster registry 302 may automatically assign the new cluster ID and/or automatically assign computers to the new cluster.

Register/unregister a computer in a cluster—since the cluster registry 302 keeps track of the particular computers in the different clusters, when a computer joins or leaves a cluster, it may notify the cluster registry 302, which then updates the computer/cluster registration information. In some embodiments, instead of waiting for a notification from the computer, the cluster registry 302 may periodically query the computers in the distributed network 300 to update computer registration information. Thus, if computers have unplanned outages or are disconnected from a cluster/the distributed network 300 without notifying the cluster registry 302, the cluster registry 302 is still able to maintain an accurate list of computers in the distributed network 300.

Send notifications of changes to the registry—when registry information changes, for example due to the creation of a new cluster or the registration/unregistration of a computer in a cluster, the cluster registry 302 may notify other computers that cache registry information in the distributed network 300 of the changes and/or update the registry information cached on those computers. The notification/update procedure may occur periodically or dynamically. For example, the cluster registry 302 may collect registry changes and provide notifications/updates every fraction of a second, second, fraction of a minute, or minute. In other embodiments, the cluster registry 302 may provide notifications/updates as soon as registry information is changed, to assure that the computers in the distributed network 300 cache the latest version of the registry information.

The cluster registry 302 may also be configured to provide other services. In some embodiments, the cluster registry may be implemented using an Apache Hadoop-derived ZooKeeper cluster.

Node storage cluster 304 and edge storage cluster 306 may store information about nodes and edges, respectively. In embodiments where the distributed network 300 includes multiple node storage clusters and/or multiple edge storage clusters, a particular node or edge in a graph representative of a network community (or information associated with the particular node or edge) may be stored on one particular node or edge storage cluster. In these embodiments, information about a particular node or edge may exist in a single storage cluster. Node/edge information may be stored in the form of data tables, described in more detail below with reference to FIGS. 4A-C.

In some embodiments, a database system that can be configured to run on computer clusters may be implemented on the storage clusters. For example, a storage cluster may use a PostgreSQL object-relational database management system. Each computer in a storage cluster may run both system software and database software in order to reduce network latency. The node storage cluster 304 and the edge storage cluster 306 may provide various services to requesters, which may include other clusters or computers in the distributed network 300, or remote/external users and systems. These services may be categorized as remote services, which may be implemented as remote procedure calls (RPCs) or Hypertext Transfer Protocol (HTTP) calls. In some embodiments, node storage cluster 304 may provide different remote services than edge storage cluster 306. In other embodiments, the requester may be the same computer the service is provided from, in which case the service is categorized as a local service. Local services may also vary according to type of storage cluster (node versus edge), or may be uniform across storage cluster type.

An example of a local service that may be uniform across storage cluster types is "Pick a computer in a cluster." This service allows a first computer to request the network address of a second computer in a cluster by providing a cluster ID. This local service may be used to distribute computational activity to all computers in a given cluster, so that processing load is distributed evenly across the computational resources available in a particular cluster. In some embodiments, the second computer may be selected via statistical techniques, round-robin techniques, any other suitable selection technique, or any combination thereof, and may take into account current computational/processing tasks. Selection of the second computer may be performed by consulting the cluster registry 302, or by consulting cached registry information on the first computer.

An example of a remote service that node storage cluster 304 may provide is "Traverse node". This service, when given a list of nodes, a direction, and an evaluation, traverses the nodes in the list with the direction and the evaluator. An example of pseudo-code for this service is described below:

```
public void traverseNodes(
   int depth, long[ ] nodeIds, Direction direction, String
   evaluatorClassName) {
      Evaluator eval = Evaluator.createEvaluator(evaluatorClassName);
      List<Integer> nodeIdsToTraverse = new ArrayList<Integer>( );
      // Read nodes and evaluate each node
      List<Node> nodes = queryNodesFromDatabase(nodeIds);
      for (Node node : nodes) {
         if (eval.evaluateNode(depth, node))
            nodeIdsToTraverse.add(node.getLocalId( ));
      }
      // Get edge locators, depending on direction.
      // If direction is OUTGOING, query Outgoing_Edge;
      // otherwise query Incoming_Edge
      // The Map returned maps a cluster id to a set of edge local id's
      // within that cluster.
      Map<Integer, Set<Integer>> locators =
         queryEdgeLocatorsFromDatabase(direction, nodeIdsToTraverse);
      List<RemoteCall> calls = new ArrayList<RemoteCall>( );
      for (Map.Entry<Integer, Set<Integer>> entry : locators) {
         int clusterId = entry.getKey( );
         int[ ] edgeIds = convertToIntArray(entry.getValues( ));
         String machine = pickMachineForCluster(clusterId);
         calls.add(
            makeAsynchronousRemoteTraverseEdgesCall(
               machine, depth, edgeIds, direction,
               evaluatorClassName
            )
         );
      }
      waitForCallToFinish(calls);
}
```

An example of a remote service that edge storage cluster 306 may provide is "Traverse edges". This service traverses a set of given edges. An example of pseudo-code for this service is described below:

```
public void traverseEdges(int depth, int[ ] edgeIds, Direction direction,
   String evaluatorClassName) {
      Evaluator eval = Evaluator.createEvaluator(evaluatorClassName);
      List<Integer> edgesToTraverse = new ArrayList<Integer>( );
      // Read edges and evaluate each one
      List<Edge> edges = queryEdgesFromDatabase(edgeIds);
      for (Edge edge : edges) {
         if (eval.evaluateEdge(edge))
            edgesToTraverse.add(edge);
      }
      // Get node locators, depending on direction.
      // If direction is OUTGOING, get the head locators of the edges;
      // otherwise get the tail locators of the edges.
      // The Map returned maps a cluster id to a set of node local id's
      // within that cluster.
      Map<Integer, Set<Integer>> locators =
         queryNodeLocatorsFromDatabase(edgesToTraverse);
      List<RemoteCall> calls = new ArrayList<RemoteCall>( );
      for (Map.Entry<Integer, Set<Integer>> entry : locators) {
         int clusterId = entry.getKey( );
         int[ ] nodeIds = convertToIntArray(entry.getValues( ));
         String machine = pickMachineForCluster(clusterId);
         calls.add(
            makeAsynchronousRemoteTraverseNodesCall(
               machine, depth + 1, edgeIds, direction,
               evaluatorClassName
            );
         );
      }
}
```

Using the "Traverse nodes" and "Traverse edges" services described above, graphs representative of network communities stored on the distributed network 300 may be traversed. In one embodiment, given a start node, the cluster registry 302 (or cached registry information) is consulted to determine the particular cluster on which the start node is stored. A remote call to the "Traverse nodes" service may then be made, passing a depth of 0, the start node, a desired direction, such as "INCOMING" or "OUTGOING", and an evaluator class. From there, alternate calls to the "Traverse edges" service and the "Traverse nodes" service may be made until the traversal is complete. Completion of the traverse may be determined by the evaluator class. In certain embodiments, this traversal may not guarantee any kind of order, such as Depth First or Breadth First order, because the computation of the traversal may be distributed across the computers in one or more clusters, and may not result in visiting nodes sequentially.

In the pseudo-code shown above for the "Traverse nodes" and "Traverse edges" services, one or more objects that inherit from an "Evaluator" abstract class may be used. An example of pseudo-code for the "Evaluator" abstract class is described below:

```
abstract class Evaluator {
   private static Map<String, Evaluator> evaluators =
      new HashMap<String, Evaluator>( );
   public static Evaluator createEvaluator(String name) {
      Evaluator result = evaluators.get(name);
      if (result == null) {
         result = Class.forName(name).newInstance( );
         // the evaluator should listen on the network for a query
         // from the remote caller.
         listenForQueries(result);
         // Let the remote caller know of this evaluator's existence,
         // so the remote caller can query it later.
         registerEvaluatorWithRemoteCaller( );
         evaluators.put(name, result);
      }
      return result;
   }
   public abstract void evaluateEdge(Edge edge);
   public abstract void evaluateNode(int depth, Node node);
}
```

For example, pseudo-code for an evaluator that counts nodes and edges is described below:

```
class NodeAndEdgesCounter extends Evaluator {
   private int nodes;
   private int edges;
   @Override
   public void evaluateEdge(Edge edge) {
      edges++;
   }
   @Override
   public void evaluateNode(int depth, Node node) {
      nodes++;
   }
   @RemoteCall
   public int getNodeCount( ) { return nodes; }
   @RemoteCall
   public int getEdgeCount( ) { return edges ; }
}
```

The @RemoteCall annotation in the example pseudo-code above indicates that those particular methods ("getNodeCount( )" and "getEdgeCount( )") may be called remotely.

Figure 4C:
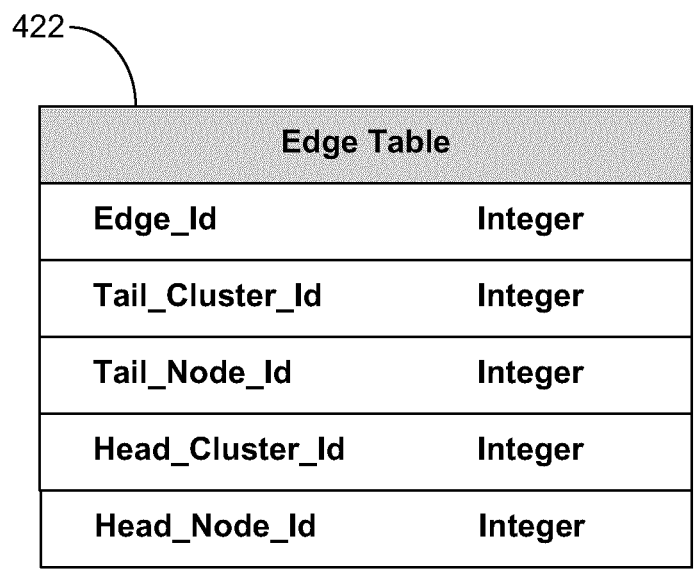

FIG. 4A-C shows illustrative data tables for graph information storage in a distributed storage/computation network, such as distributed network 300, in accordance with one embodiment of the invention. FIG. 4A shows common data tables 400 that may be stored on each computer and/or cluster in the distributed network 300. For example, a particular computer may store cluster information table 402, which includes information about the cluster the particular computer is in. The cluster information table 402 may include a unique identifier or ID assigned to the cluster, along with the particular type of cluster (e.g., node storage or edge storage) it is. A particular computer may also store a registry cache table 404, which may be a cache of the data stored in the cluster registry 302. The registry cache table 404 may store the unique ID for each cluster in the distributed network 300, as well as an identifier (such as a network/IP address) for each computer in each cluster.

Data tables 410, shown in FIG. 4B, may store information about nodes in a network community, and may be stored on computers in node storage cluster 304. In some embodiments, each node storage cluster is responsible for a subset of the nodes in a network community, and stores the information for that subset of nodes. For example, a node table 412 stored on computers in node storage cluster 304 may contain information only for nodes that node storage cluster 304 is responsible for. Node table 412 may store an identifier for a node stored in a particular node storage cluster, and each node may have a different node table. The identifier may be a unique, local identifier used to identify the node within the cluster. In other embodiments, the node table 412 may also store application specific data. For example, for the purposes of calculating a trust score, node table 412 may store a mean trust value and/or a trust value standard deviation for the node.

In some embodiments, computers in node storage cluster 304 may also store an outgoing edge storage table 414. Outgoing edge storage table 414 may store all outgoing edges for all nodes in a given cluster. For example, an outgoing edge storage table stored on computers in node storage cluster 304 may only store outgoing edge information for nodes that storage cluster 304 is responsible for. For each outgoing edge, the storage table 414 may store a node identifier that identifies the particular node within node storage cluster 304 that is associated with the outgoing edge. The storage table 414 may also store a cluster identifier for the edge that identifies the particular cluster the edge is stored in, as well as an edge identifier that identifies the edge in that particular cluster.

In some embodiments, computers in node storage cluster 304 may also store an incoming edge storage table 416. Incoming edge storage table 416 may store all incoming edges for all nodes in a given cluster, and in some embodiments may be structurally similar to outgoing edge storage table 414. For example, an incoming edge storage table stored on computers in node storage cluster 304 may only store incoming edge information for nodes that storage cluster 304 is responsible for. For each incoming edge, the storage table 416 may store a node identifier that identifies the particular node within node storage cluster 304 that is associated with the incoming edge. The storage table 416 may also store a cluster identifier for the edge that identifies the particular cluster the edge is stored in, as well as an edge identifier that identifies the edge in that particular cluster.

Data table 420, shown in FIG. 4C, may store information about edges in a network community, and may be stored on computers in edge storage cluster 306. In some embodiments, each edge storage cluster is responsible for a subset of the edges in a network community, and stores the information for that subset of edges. For example, an edge table 422 stored on computers in edge storage cluster 306 may only contain information for edges that edge storage cluster 306 is responsible for. Edge table 422 may store an identifier for an edge stored in a particular edge storage cluster, and each edge may have a different edge table 422. The identifier may be a unique, local identifier used to identify the edge within the cluster. The edge table 422 may also store information about the nodes that a particular edge connects. In some embodiments, an edge may be a directed edge that links a head node and a tail node. In these embodiments, the edge table 422 may store a cluster identifier and a node identifier for each of the head node and the tail node. The cluster identifier identifies the particular node storage cluster in the distributed system 300 that the head or tail node is stored in, and the node identifier identifies the particular head or tail node within that node storage cluster. In other embodiments, other data tables may be stored in cluster registry 302, node storage cluster 304, or edge storage cluster 306.

Figure 5A:
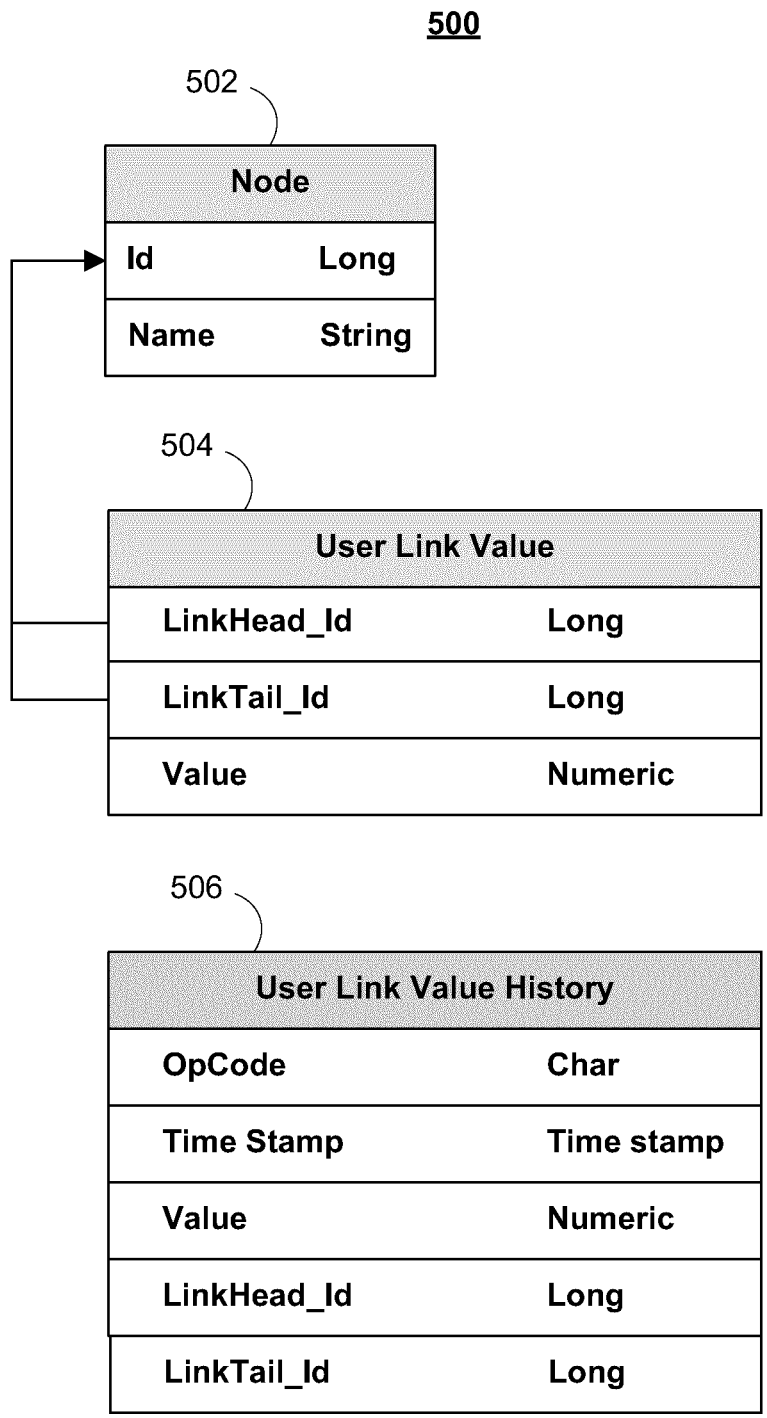
FIGS. 5A and 5B show illustrative data tables for supporting connectivity determinations within a network community in accordance with one embodiment of the invention.

FIG. 5A shows illustrative data tables 500 used to support the connectivity determinations of the present invention. One or more of tables 500 may be stored in, for example, a relational database in data store 110 (FIG. 1). Table 502 may store an identification of all the nodes registered in the network community. A unique identifier may be assigned to each node and stored in table 502. In addition, a string name may be associated with each node and stored in table 502. As described above, in some embodiments, nodes may represent individuals or entities, in which case the string name may include the individual or person's first and/or last name, nickname, handle, or entity name.

Table 504 may store user connectivity values. User connectivity values may be positive, indicating some degree of trust between two or more parties, or may be negative, indicating some degree of distrust between two or more parties. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes, the content of the interaction, and/or the result of the interaction. For example, each simple email exchange between two nodes may automatically increase or decrease the user connectivity values connecting those two nodes by a fixed amount. In some embodiments, the content of the emails in the email exchange may be processed by, for example, application server 106 (FIG. 1) to determine the direction of the user connectivity value change as well as its magnitude. For example, an email exchange regarding a transaction executed in a timely fashion may increase the user connectivity value, whereas an email exchange regarding a missed deadline may decrease the user connectivity value. The content of the email exchange or other interaction may be processed by using heuristic and/or data/text mining techniques to parse the content of the interaction. For example, a language parser may be used to identify keywords in the email exchange. In some embodiments, individual emails and/or the email exchange may be processed to identify keywords that are associated with successful/favorable transactions and/or keywords that are associated with unsuccessful/unfavorable transactions, and the difference between the frequency/type of the keywords may affect the user connectivity value. In certain embodiments, natural language parsers may be used to extract semantic meaning from structured text in addition to keyword detection.

More complicated interactions (e.g., product or service sales or inquires) between two nodes may increase or decrease the user connectivity values connecting those two nodes by some larger fixed amount. In some embodiments, user connectivity values between two nodes may always be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In some embodiments, the magnitude of the user connectivity value change may be based on the content of the interactions. For example, a failed transaction involving a small monetary value may cause the user connectivity value to decrease less than a failed transaction involving a larger monetary value. In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. As described above, user connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. A composite user connectivity value including subjective and objective components may also be used. For example, third-party information may be consulted to form an objective component based on, for example, the number of consumer complaints, credit score, socio-economic factors (e.g., age, income, political or religions affiliations, and criminal history), or number of citations/hits in the media or in search engine searches. Third-party information may be accessed using communications network 104 (FIG. 1). For example, a third-party credit bureau's database may be polled or a personal biography and background information, including criminal history information, may be accessed from a third-party database or data source (e.g., as part of data sources 108 (FIG. 1) or a separate data source) or input directly by a node, user, or system administrator. In some embodiments, the third-party data source(s) or system (s) may also include third-party user connectivity values and transaction histories, related to user interactions with the third-party system(s). In these embodiments, the user connectivity value or composite user connectivity value may also include one or more components based on the third-party user connectivity values and transaction histories.

In some embodiments, user connectivity values may be manually assigned by members of the network community by adjusting aspects of a visualization of a social graph. For example, a user may decide that they trust a contact that is represented by a rendered node in a visualization of a social graph on a user device (such as user devices 116 (FIG. 1)). In order to increase trustworthiness "score" associated with that contact, the user may increase the size of the rendered node associated with that contact by, for example, interacting with the node on a touch sensitive screen of the user device. Such embodiments will be described in greater detail with respect to FIG. 10.

In other embodiments, the user connectivity or trust value may be calculated objectively. In one embodiment, the trust value of a first node for a second node may be calculated based on the number of paths linking the two nodes, one or more path scores associated with the linking paths, connectivity statistics associated with the first node, and/or other connectivity information associated with the first node.

Table 504 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 506 may store an audit log of table 504. Table 506 may be analyzed to determine which nodes or links have changed in the network community. In some embodiments, a database trigger is used to automatically insert an audit record into table 506 whenever a change of the data in table 504 is detected. For example, a new link may be created, a link may be removed, and/or a user connectivity value may be changed. This audit log may allow for decisions related to connectivity values to be made prospectively (i.e., before an anticipated event). Such decisions may be made at the request of a user, or as part of an automated process, such as the processes described below with respect to FIG. 5. This prospective analysis may allow for the initiation of a transaction (or taking of some particular action) in a fluid and/or dynamic manner. After such a change is detected, the trigger may automatically create a new row in table 506. Table 506 may store an identification of the changed node, and identification of the changed link head, changed link tail, and/or the user connectivity value to be assigned to the changed link. Table 506 may also store a timestamp indicative of the time of the change and/or an operation code. In some embodiments, operation codes may include "insert," "update," and/or "delete" operations, corresponding to whether a link was inserted, a user connectivity value was changed, or a link was deleted, respectively. Other operation codes may be used in other embodiments.

Figure 5B:
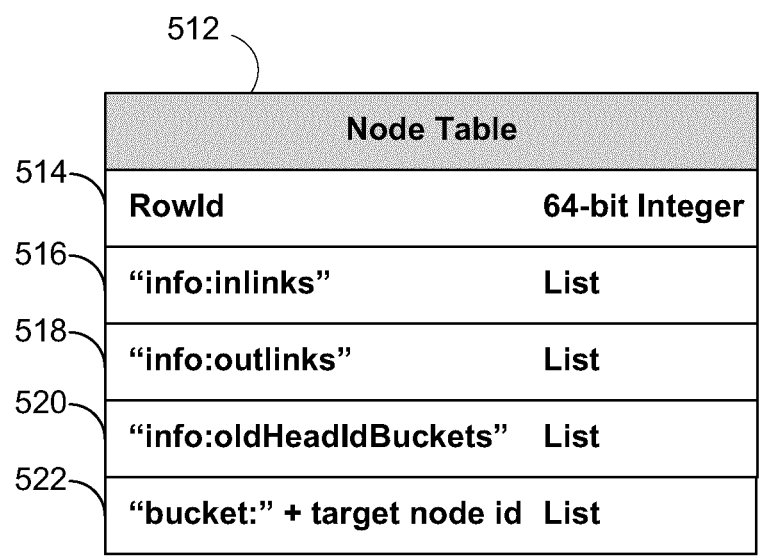

FIG. 5B shows illustrative data structure 510 used to support the connectivity determinations of the present invention. In some embodiments, data structure 510 may be stored using key-value store 112 (FIG. 1), while tables 500 are stored in data store 110 (FIG. 1). As described above, key-value store 112 (FIG. 1) may implement an HBase storage system and include BigTable support. Like a traditional relational database management system, the data shown in FIG. 5B may be stored in tables. However, the BigTable support may allow for an arbitrary number of columns in each table, whereas traditional relational database management systems may require a fixed number of columns.

Data structure 510 may include node table 512. In the example shown in FIG. 5B, node table 512 includes several columns Node table 512 may include row identifier column 514, which may store 64-bit, 128-bit, 256-bit, 512-bit, or 1024-bit integers and may be used to uniquely identify each row (e.g., each node) in node table 512. Column 516 may include a list of all the incoming links for the current node. Column 518 may include a list of all the outgoing links for the current node. Column 520 may include a list of node identifiers to which the current node is connected. A first node may be connected to a second node if outgoing links may be followed to reach the second node. For example, for A→B, A is connected to B, but B may not be connected to A. As described in more detail below, column 520 may be used during the portion of process 600 (FIG. 6A) shown in FIG. 6B. Node table 512 may also include one or more "bucket" columns 522. These columns may store a list of paths that connect the current node to a target node. As described above, grouping paths by the last node in the path (e.g., the target node) may facilitate connectivity computations. As shown in FIG. 5B, in some embodiments, to facilitate scanning, bucket column names may include the target node identifier appended to the end of the "bucket:" column name.

Figure 6A:
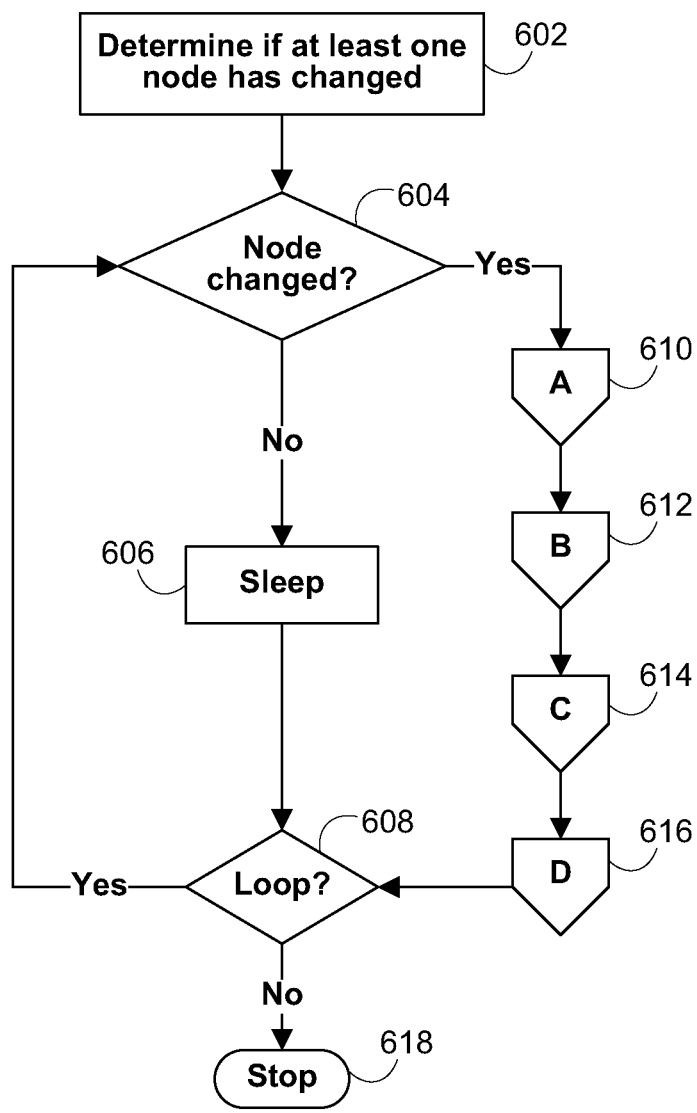
FIGS. 6A-6E show illustrative processes for supporting connectivity determinations within a network community in accordance with one embodiment of the invention.

FIGS. 6A-6E show illustrative processes for determining the connectivity of nodes within a network community. FIG. 6A shows process 600 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIGS. 4A-4C and 6A-6E may be executed to make decisions prospectively (i.e., before an anticipated event). Such decisions may be made at the request of a user, or as part of an automated process, such as the processes described below with respect to FIGS. 7 and 8. This prospective analysis may allow for the initiation of a transaction (or taking of some particular action) in a fluid and/or dynamic manner.

In some embodiments, the processes described with respect to FIGS. 4A-4C and 6A-6E may be executed to provide information to a user. Such presentations may be made at the request of a user, or as part of an automated presentation. This information may include, but is not limited to, static and/or interactive visualizations of connectivity values within a user's associated network community or communities as will be described with respect to FIGS. 9-15. Providing this information to a user may allow the user to better understand what other individuals and/or entities they may trust within a network community, and/or may encourage and/or discourage particular interactions within a user's associated network community or communities.

At step 602, a determination is made whether at least one node has changed in the network community. As described above, an audit record may be inserted into table 506 (FIG. 5) after a node has changed. By analyzing table 506 (FIG. 5), a determination may be made (e.g., by application server 106 of FIG. 1) that a new link has been added, an existing link has been removed, or a user connectivity value has changed. If, at step 604, it is determined that a node has changed, then process 600 continues to step 610 (shown in FIG. 6B) to prepare the changed nodes, step 612 (shown in FIG. 6C) to calculate paths originating from the changed nodes, step 614 (shown in FIG. 6D) to remove paths that go through a changed node, and step 616 (shown in FIG. 6E) to calculate paths that go through a changed node. It should be noted that more than one step or task shown in FIGS. 6B, 6C, 6D, and 6E may be performed in parallel using, for example, a cluster of cores. For example, multiple steps or tasks shown in FIG. 6B may be executed in parallel or in a distributed fashion, then multiple steps or tasks shown in FIG. 6C may be executed in parallel or in a distributed fashion, then multiple steps or tasks shown in FIG. 6D may be executed in parallel or in a distributed fashion, and then multiple steps or tasks shown in FIG. 6E may be executed in parallel or in a distributed fashion. In this way, overall latency associated with process 600 may be reduced.

If a node change is not detected at step 604, then process 600 enters a sleep mode at step 606. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 616 or after a period of sleep at step 606, process 600 may determine whether or not to loop at step 608. For example, if all changed nodes have been updated, then process 600 may stop at step 618. If, however, there are more changed nodes or links to process, then process 600 may loop at step 608 and return to step 604.

In practice, one or more steps shown in process 600 may be combined with other steps, performed in any suitable order, performed in parallel (e.g., simultaneously or substantially simultaneously), or removed.

Figure 6B:
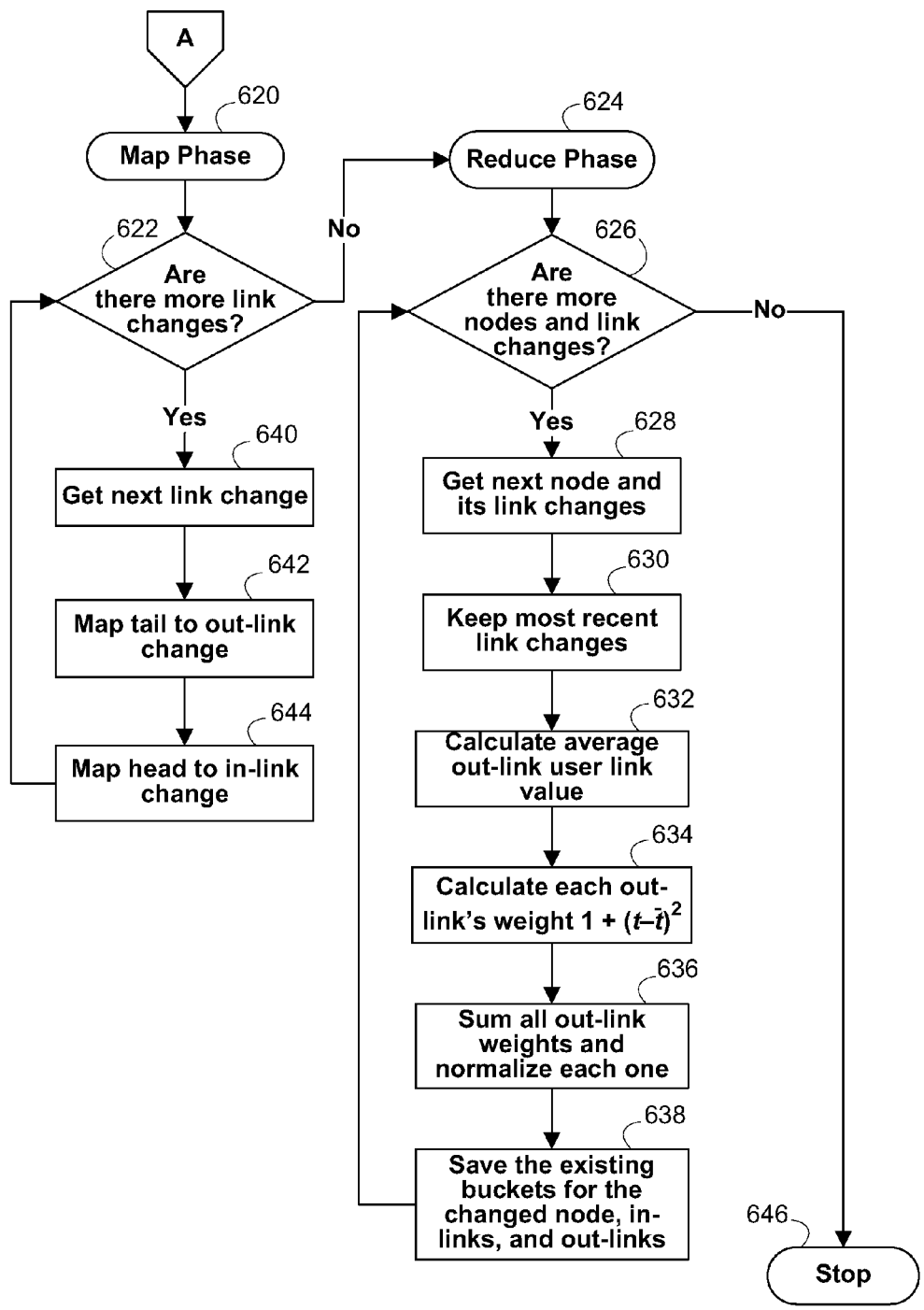

FIGS. 6B-6E each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 6B, in order to prepare any changed nodes, map phase 620 may include determining if there are any more link changes at step 622, retrieving the next link change at step 640, mapping the tail to out-link change at step 642, and mapping the head to in-link change at step 644.

If there are no more link changes at step 622, then, in reduce phase 624, a determination may be made at step 626 that there are more nodes and link changes to process. If so, then the next node and its link changes may be retrieved at step 628. The most recent link changes may be preserved at step 630 while any intermediate link changes are replaced by more recent changes. For example, the timestamp stored in table 506 (FIG. 5A) may be used to determine the time of every link or node change. At step 632, the average out-link user connectivity value may be calculated. For example, if node $n_1$ has eight out-links with assigned user connectivity values, these eight user connectivity values may be averaged at step 632. At step 634, each out-link's weight may be calculated in accordance with equation (1) above. All the out-link weights may then be summed and used to normalize each out-link weight at step 636. For example, each out-link weight may be divided by the sum of all out-link weights. This may yield a weight between 0 and 1 for each out-link. At step 638, the existing buckets for the changed node, in-links, and out-links may be saved. For example, the buckets may be saved in key-value store 112 (FIG. 1) or data store 110 (FIG. 1). If there are no more nodes and link changes to process at step 626, the process may stop at step 646.

Figure 6C:
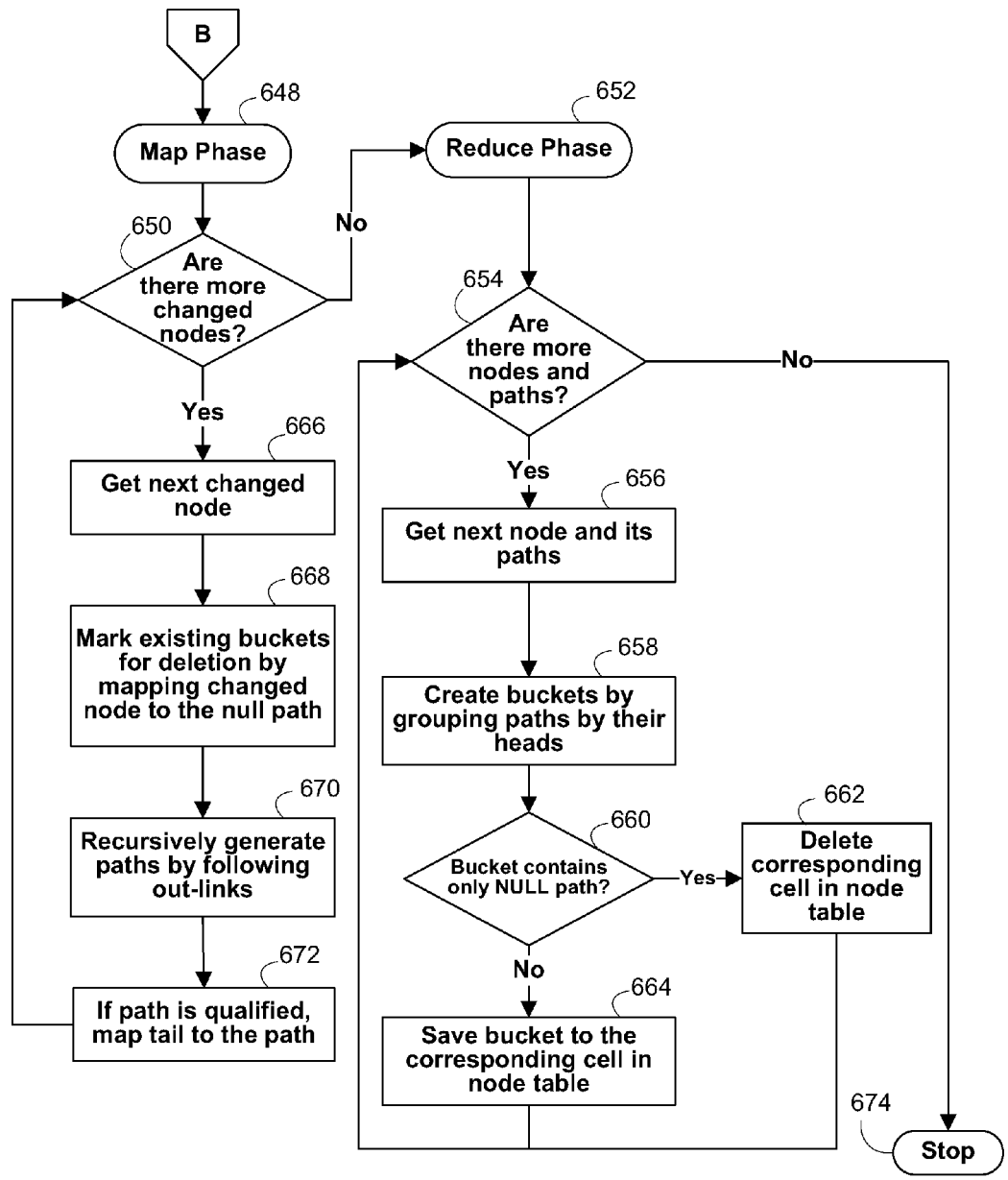

As shown in FIG. 6C, in order to calculate paths originating from changed nodes, map phase 648 may include determining if there are any more changed nodes at step 650, retrieving the next changed node at step 666, marking existing buckets for deletion by mapping changed nodes to the NULL path at step 668, recursively generating paths by following out-links at step 670, and if the path is a qualified path, mapping the tail to the path. Qualified paths may include paths that satisfy one or more predefined threshold functions. For example, a threshold function may specify a minimum or a maximum path weight. Paths with path weights greater than the minimum path weight and/or less than the maximum path weight may be designated as qualified paths.

If there are no more changed nodes at step 650, then, in reduce phase 652, a determination may be made at step 654 that there are more nodes and paths to process. If so, then the next node and its paths may be retrieved at step 656. At step 658, buckets may be created by grouping paths by their head. If a bucket contains only the NULL path at step 660, then the corresponding cell in the node table may be deleted at step 662. If the bucket contains more than the NULL path, then at step 664 the bucket is saved to the corresponding cell in the node table. If there are no more nodes and paths to process at step 656, the process may stop at step 674.

Figure 6D:
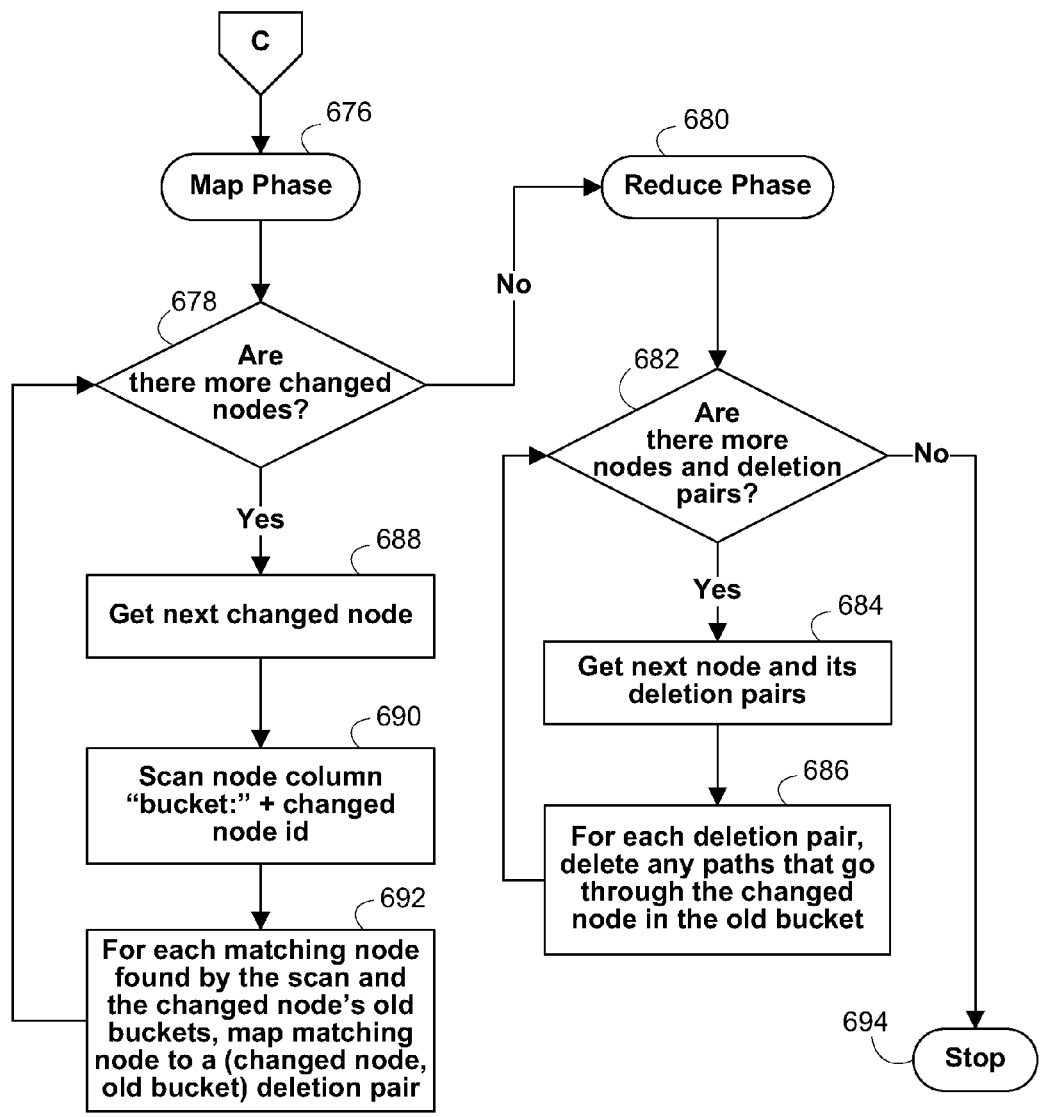

As shown in FIG. 6D, in order to remove paths that go through a changed node, map phase 676 may include determining if there are any more changed nodes at step 678 and retrieving the next changed node at step 688. At step 690, the "bucket:" column in the node table (e.g., column 522 of node table 512 (both of FIG. 5B)) corresponding to the changed node may be scanned. For example, as described above, the target node identifier may be appended to the end of the "bucket:" column name. Each bucket may include a list of paths that connect the current node to the target node (e.g., the changed node). At step 692, for each matching node found by the scan and the changed node's old buckets, the matching node may be matched to a (changed node, old bucket) deletion pair.

If there are no more changed nodes at step 678, then, in reduce phase 680, a determination may be made at step 684 that there are more node and deletion pairs to process. If so, then the next node and its deletion pairs may be retrieved at step 684. At step 686, for each deletion pair, any paths that go through the changed node in the old bucket may be deleted. If there are no more nodes and deletion pairs to process at step 682, the process may stop at step 694.

Figure 6E:
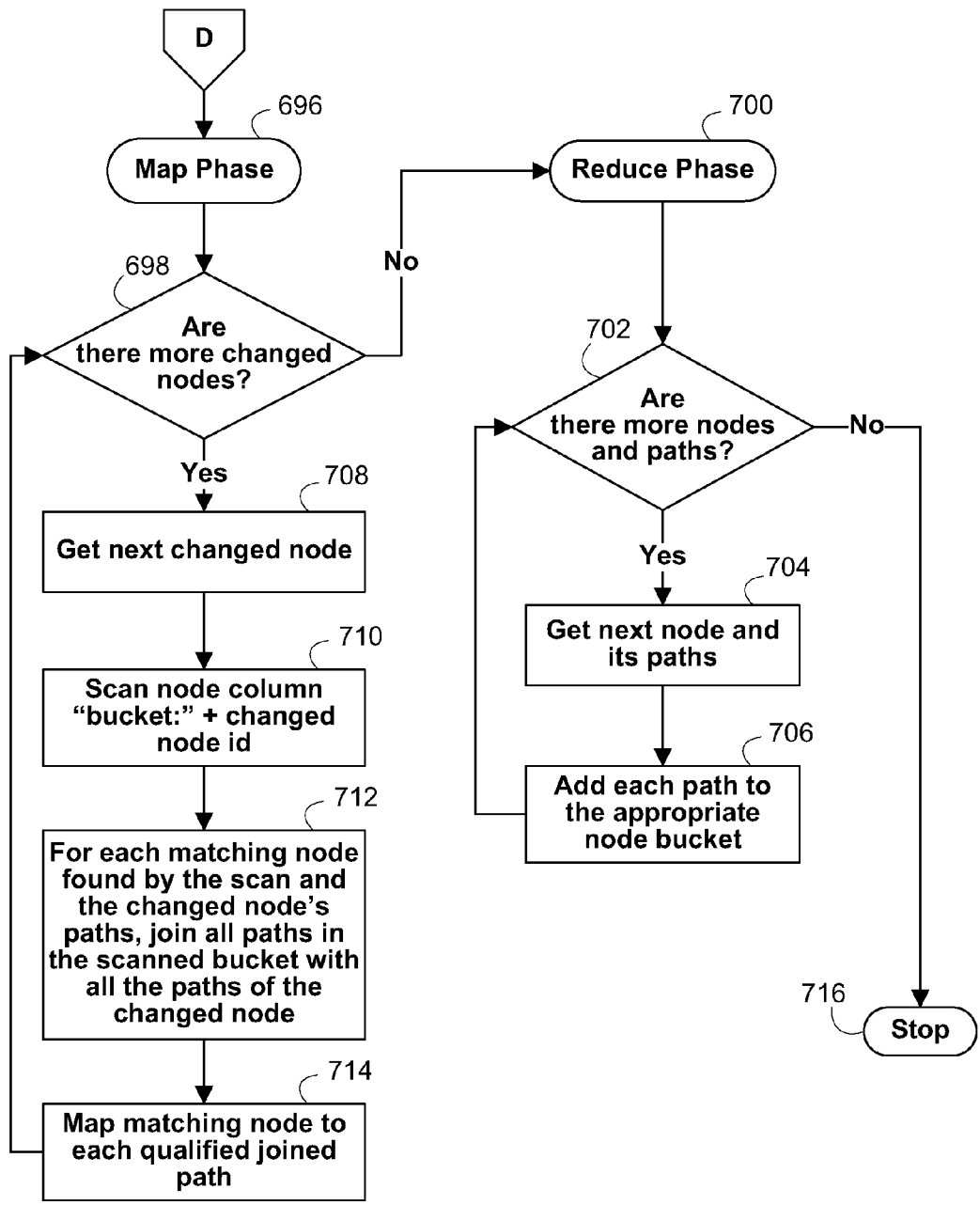

As shown in FIG. 6E, in order to calculate paths that go through a changed node, map phase 696 may include determining if there are any more changed nodes at step 698 and retrieving the next changed node at step 708. At step 710, the "bucket:" column in the node table (e.g., column 522 of node table 512 (both of FIG. 5B)) corresponding to the changed node may be scanned. At step 712, for each matching node found in the scan and the changed node's paths, all paths in the scanned bucket may be joined with all paths of the changed bucket. At step 714, each matching node may be mapped to each qualified joined path.

If there are no more changed nodes at step 698, then, in reduce phase 700, a determination may be made at step 702 that there are more node and paths to process. If so, then the next node and its paths may be retrieved at step 704. Each path may then be added to the appropriate node bucket at step 706. If there are no more nodes and paths to process at step 702, the process may stop at step 716.

Figure 7:
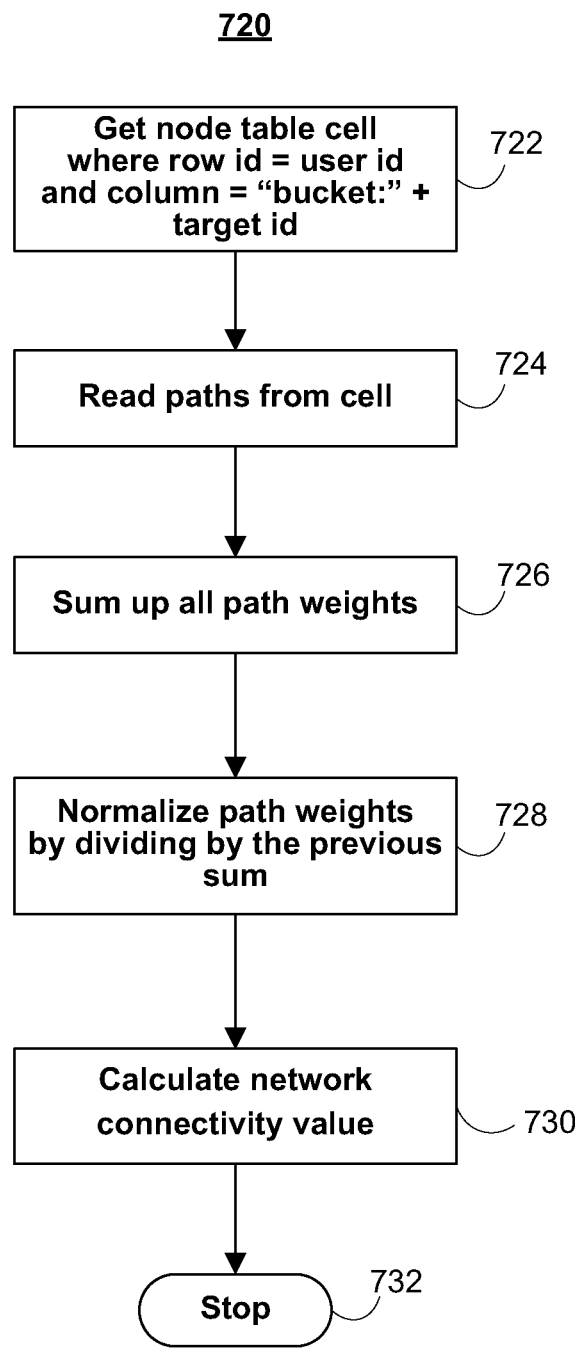
FIG. 7 shows an illustrative process for querying all paths to a target node and computing a network connectivity value in accordance with one embodiment of the invention.

FIG. 7 shows illustrative process 720 for supporting a user query for all paths from a first node to a target node. For example, a first node (representing, for example, a first individual or entity) may wish to know how connected the first node is to some second node (representing, for example, a second individual or entity) in the network community. In the context of trust described above (and where the user connectivity values represent, for example, at least partially subjective user trust values), this query may return an indication of how much the first node may trust the second node. In general, the more paths connecting the two nodes may yield a greater (or lesser if, for example, adverse ratings are used) network connectivity value (or network trust amount).

At step 722, the node table cell where the row identifier equals the first node identifier and the column equals the target node identifier appended to the "bucket:" column name prefix is accessed. All paths may be read from this cell at step 724. The path weights assigned to the paths read at step 724 may then be summed at step 726. At step 728, the path weights may be normalized by dividing each path weight by the computed sum of the path weights. A network connectivity value may then be computed at step 730. For example, each path's user connectivity value may be multiplied by its normalized path weight. The network connectivity value may then be computed in some embodiments in accordance with:

$$t_{network} = \Sigma t_{path} \times w_{path} \quad (7)$$

where $t_{path}$ is the user connectivity value for a path (given in accordance with equation (5)) and $w_{path}$ is the normalized weight for that path. The network connectivity value may then be held or output by processing circuitry of application server 106, and/or stored on data store 110 (FIG. 1). In addition, a decision-making algorithm may access the network connectivity value in order to make automatic decisions (e.g., automatic network-based decisions, such as authentication or identity requests) on behalf of the user. Network connectivity values may additionally or alternatively be outputted to external systems and processes located at third-parties. The external systems and processes may be configured to automatically initiate a transaction (or take some particular course of action) based, at least in part, on the received network connectivity values. For example, some locales or organizations may require identity references in order to apply for a document (e.g., a passport, driver's license, group or club membership card, etc.). The identity reference or references may vouch that an individual actually exists and/or is the individual the applicant is claiming to be. Network connectivity values may be queried by the document issuer (e.g., a local government agency, such as the Department of Motor Vehicles or a private organization) and used as one (or the sole) metric in order to verify the identity of the applicant, the identity of an identity reference, or both. In some embodiments, network connectivity values may be used as an added assurance of the identity of an applicant or reference in conjunction with more traditional forms of identification (e.g., document verification and knowledge-based identity techniques). If the document issuer (or some other party trusted by the document issuer) has a set of strong paths from the applicant or reference, this may indicate a higher degree of confidence in the identity of the applicant or reference. Such an indication may be outputted to the third-party system or process. Process 720 may stop at step 732.

In practice, one or more steps shown in process 720 may be combined with other steps, performed in any suitable order, performed in parallel (e.g., simultaneously or substantially simultaneously), or removed. In addition, as described above, various threshold functions may be used in order to reduce computational complexity. For example, one or more threshold functions defining the maximum and/or minimum number of links to traverse may be defined. Paths containing more than the maximum number of links or less than the minimum number of links specified by the threshold function(s) may not be considered in the network connectivity determination. In addition, various maximum and/or minimum threshold functions relating to link and path weights may be defined. Links or paths above a maximum threshold weight or below a minimum threshold weight specified by the threshold function(s) may not be considered in the network connectivity determination.

Although process 720 describes a single user query for all paths from a first node to a target node, in actual implementations groups of nodes may initiate a single query for all the paths from each node in the group to a particular target node. For example, multiple members of a network community may all initiate a group query to a target node. Process 720 may return an individual network connectivity value for each querying node in the group or a single composite network connectivity value taking into account all the nodes in the querying group. For example, the individual network connectivity values may be averaged to form a composite value or some weighted average may be used. The weights assigned to each individual network connectivity value may be based on seniority in the community (e.g., how long each node has been a member in the community), rank, or social stature. In addition, in some embodiments, a user may initiate a request for network connectivity values for multiple target nodes in a single query. For example, node $n_1$ may wish to determine network connectivity values between it and multiple other nodes. For example, the multiple other nodes may represent several candidates for initiating a particular transaction with node $n_1$. By querying for all the network connectivity values in a single query, the computations may be distributed in a parallel fashion to multiple cores so that some or all of the results are computed substantially simultaneously.

In addition, queries may be initiated in a number of ways. For example, a user (represented by a source node) may identify another user (represented by a target node) in order to automatically initiate process 720. A user may identify the target node in any suitable way, for example, by selecting the target node from a visual display, graph, or tree, by inputting or selecting a username, handle, network address, email address, telephone number, geographic coordinates, or unique identifier associated with the target node, or by speaking a predetermined command (e.g., "query node 1" or "query node group 1, 5, 9" where 1, 5, and 9 represent unique node identifiers). After an identification of the target node or nodes is received, process 720 may be automatically executed. The results of the process (e.g., the individual or composite network connectivity values) may then be automatically sent to one or more third-party services or processes as described above.

In an embodiment, a user may utilize access application 102 to generate a user query that is sent to access application server 106 over communications network 104 (see also, FIG. 1) and automatically initiate process 520. For example, a user may access an Apple iOS, Android, or WebOs application or any suitable application for use in accessing application 106 over communications network 104. The application may display a searchable list of relationship data related to that user (e.g., "friend" or "follower" data) from one or more of Facebook, MySpace, open Social, Friendster, Bebop, hi5, Rout, PerfSpot, Yahoo! 360, LinkedIn, Twitter, Google Buzz, Really Simple Syndication readers or any other social networking website or information service. In some embodiments, a user may search for relationship data that is not readily listed—i.e., search Facebook, Twitter, or any suitable database of information for target nodes that are not displayed in the searchable list of relationship data. A user may select a target node as described above (e.g., select an item from a list of usernames representing a "friend" or "follower") to request a measure of how connected the user is to the target node. Using the processes described with respect to FIGS. 4A-C, 5A and 5B, and 6A-6E, this query may return an indication of how much the user may trust the target node. The returned indication may be displayed to the user using any suitable indicator. In some embodiments, indicator may be a percentage that indicates how trustworthy the target node is to the user.

In some embodiments, a user may utilize access application 102 to provide manual assignments of at least partially subjective indications of how trustworthy the target node is. For example, the user may specify that he or she trusts a selected target node (e.g., a selected "friend" or "follower") to a particular degree. The particular degree may be in the form of a percentage that represents the user's perception of how trustworthy the target node is. The user may provide this indication before, after, or during process 720 described above. The indication provided by the user (e.g., the at least partially subjective indications of trustworthiness) may then be automatically sent to one or more third-party services or processes as described above. In some embodiments, the indications provided by the user may cause a node and/or link to change in a network community. This change may cause a determination to be made that at least one node and/or link has changed in the network community, which in turn triggers various processes as described with respect to FIGS. 4A-C, 5A and 5B, and 6A-6E.

In some embodiments, a user may utilize access application 102 to interact with or explore a network community. For example, a user may be presented with an interactive visualization that includes one or more implicit or explicit representations of connectivity values between the user and other individuals and/or entities within the network community. This interactive visualization, described below with respect to FIGS. 9-15, may allow the user to better understand what other individuals and/or entities they may trust within a network community, and/or may encourage and/or discourage particular interactions within a user's associated network community or communities.

In some embodiments, a path counting approach may be used in addition to or in place of the weighted link approach described above. Processing circuitry (e.g., of application server 106) may be configured to count the number of paths between a first node $n_1$ and a second node $n_2$ within a network community. A connectivity rating $R_{n_1n_2}$ may then be assigned to the nodes. The assigned connectivity rating may be proportional to the number of paths, or relationships, connecting the two nodes. A path with one or more intermediate nodes between the first node $n_1$ and the second node $n_2$ may be scaled by an appropriate number (e.g., the number of intermediate nodes) and this scaled number may be used to calculate the connectivity rating.

In some embodiments, the processes described with respect to FIGS. 6A-E and 7 herein may be replaced or supplemented by the processes described with respect to FIGS. 6A-H and 7 of International Patent Application No. CA201150569, filed Sep. 16, 2011, which is fully incorporated by reference herein in its entirety.

Figure 8:
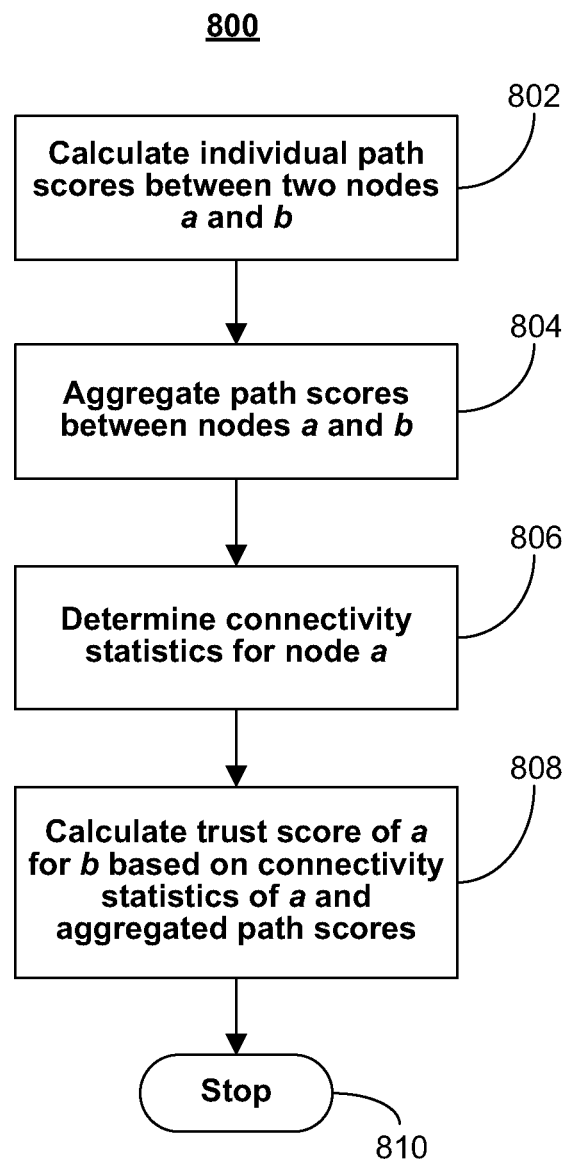
FIG. 8 shows an illustrative process for determining a connectivity or trust score of one node for another node based on connectivity statistics, in accordance with one embodiment of the invention.

In certain embodiments, the connectivity statistics of one or more nodes may be used to determine the connectivity score or rating between one node and another node. FIG. 8 shows illustrative process 800 for determining a connectivity or trust score of a node a for another node b based on connectivity statistics, in accordance with one embodiment of the invention. In step 802, a path score is determined for each path between node a and node b. In some embodiments, path scores may vary as a function of the path length. For example, the path score of a particular path may be calculated in accordance with:

$$PathScore(\text{path}) = \frac{1}{\text{Length}(\text{path})^2} \quad (8)$$

where Length(path) is the length of a particular path between a and b, for example in terms of the number of nodes the path passes through. While in equation (8), the path score is shown to vary inversely according to the square of the length of the path, in other embodiments, the exponent may vary, and/or the path score function may vary according to some other function of path length. In some embodiments, the path score may also be based on one or more specific ratings or weights associated with one or more edges along the path, where an edge is a path between two adjacent nodes. For example, the path score may vary either directly or inversely proportional to the sum or the product of one or more ratings or weights associated with each edge along the path. In some embodiments, only the ratings or weights associated with specific edges may be included, and in other embodiments, ratings or weights associated with all of the edges in a particular path may be considered.

In some embodiments, the path score may vary as one or more functions of the weights associated with one or more edges along the path. For example, in some embodiment, the path score of a particular path may be calculated in accordance with:

$$PathScore(\text{path}) = g(\text{path}) * \prod_{edge \in path} f(w_{edge}) \quad (9)$$

where $f(w)$ is defined in accordance with:

$$f(w) = \begin{cases} 4, & \text{if } w < 0.2 \\ 2, & \text{if } 0.2 \le w < 0.4 \\ 1, & \text{if } 0.4 \le w < 0.8 \\ 2 & \text{if } 0.8 \le w < 1.0 \\ 4, & \text{if } w = 1.0 \end{cases} \quad (10)$$

and g(path) is defined in accordance with:

$$g(\text{path}) = \begin{cases} -1, & \exists w_{edge} < .6 \\ 1, & \text{otherwise} \end{cases} \quad (11)$$

After path scores for one or more of the paths linking nodes a and b have been calculated in step 802, the calculated path scores may be aggregated in step 804 to result in a connectivity value between the two nodes. The connectivity value between nodes a and b may be given in accordance with:

$$\text{Connectivity}(a, b) = \sum_{p \in Paths(a,b)} PathScore(p) \quad (12)$$

where Paths(a,b) represent one or more of the paths between nodes a and b and PathScore(p) represents the path score of one of the paths in Paths(a,b) (i.e., one of the paths between nodes a and b). While in equation (12), the connectivity between nodes a and b is a summation of path scores associated with one or more paths between a and b, in other embodiments, the connectivity may be a product or any other function of the path scores associated with one or more paths between a and b.

In step 806, the connectivity statistics for node a may be determined. First, a node sample may be selected for node a. In one embodiment, the node sample may include nodes that meet some network parameter with respect to node a. For example, every individual node with a network distance less than or equal to some number x from node a (i.e., a path exists from the node to node a with length less than or equal to x) may be included in the node sample. For example, in certain embodiments, every individual node with a network distance less than or equal to 3 from node a may be included in the node sample. In some embodiments, the node sample may include a certain number of individual nodes randomly selected from the population. In some embodiments, the node sample may include a certain number of individual nodes visited via a random exploration of the network, starting from node a, in a manner similar to a graph traversal. In some embodiments, the node sample may include a certain number of nodes that are directly connected to a. For example, in certain embodiments, the node sample may include every node with a network distance of 1 from node a. In other embodiments, any other suitable method for selecting individual nodes in the network may be used to create the node sample.

Once the sample has been selected, a mean path score $\mu_a$, in accordance with:

$$\mu_a = \frac{1}{|S|} \sum_{y \in S} \text{Connectivity}(a, y) \quad (13)$$

and a standard deviation $\sigma_a$, in accordance with:

$$\sigma_a = \sqrt{\frac{1}{|S|} \sum_{y \in S} (\text{Connectivity}(a, y) - \mu_a)^2} \quad (14)$$

may be calculated for node a, where S is the number of individual nodes in the sample and Connectivity(a,y) is the connectivity (as described above in equation (12)) between node a and a node y in the sample S.

Once the connectivity statistics have been determined for node a, the trust or connectivity score (not to be confused with the connectivity described above in equation (9)) of node a for node b may be determined in step 808, based on the connectivity statistics of node a and the connectivity between node a and node b. In one embodiment, the trust or connectivity score may be determined as a function of the area under the normal curve for $\mu_a$ and $\sigma_a$. For example, let n be the number of standard deviations the connectivity between node a and node b is away from the mean path score $\mu_a$:

$$n = \frac{\text{Connectivity}(a, b) - \mu_a}{\sigma_a} \quad (12)$$

The trust or connectivity score between node a and node b TrustScore(a,b) may then be determined as a function of the area under the normal curve, in accordance with:

$$TrustScore(a, b) = 0.5 + \frac{\text{erf}\left(\frac{n}{\sqrt{2}}\right)}{2} \quad (10)$$

In some embodiments, the trust score may be used as is, be multiplied by 100 and presented as a percentage, or be multiplied by 1000 and presented as a number. The process 800 may then stop at step 810.

Each equation presented above should be construed as a class of equations of a similar kind, with the actual equation presented being one representative example of the class. For example, the equations presented above include all mathematically equivalent versions of those equations, reductions, simplifications, normalizations, and other equations of the same degree.

Figure 9:
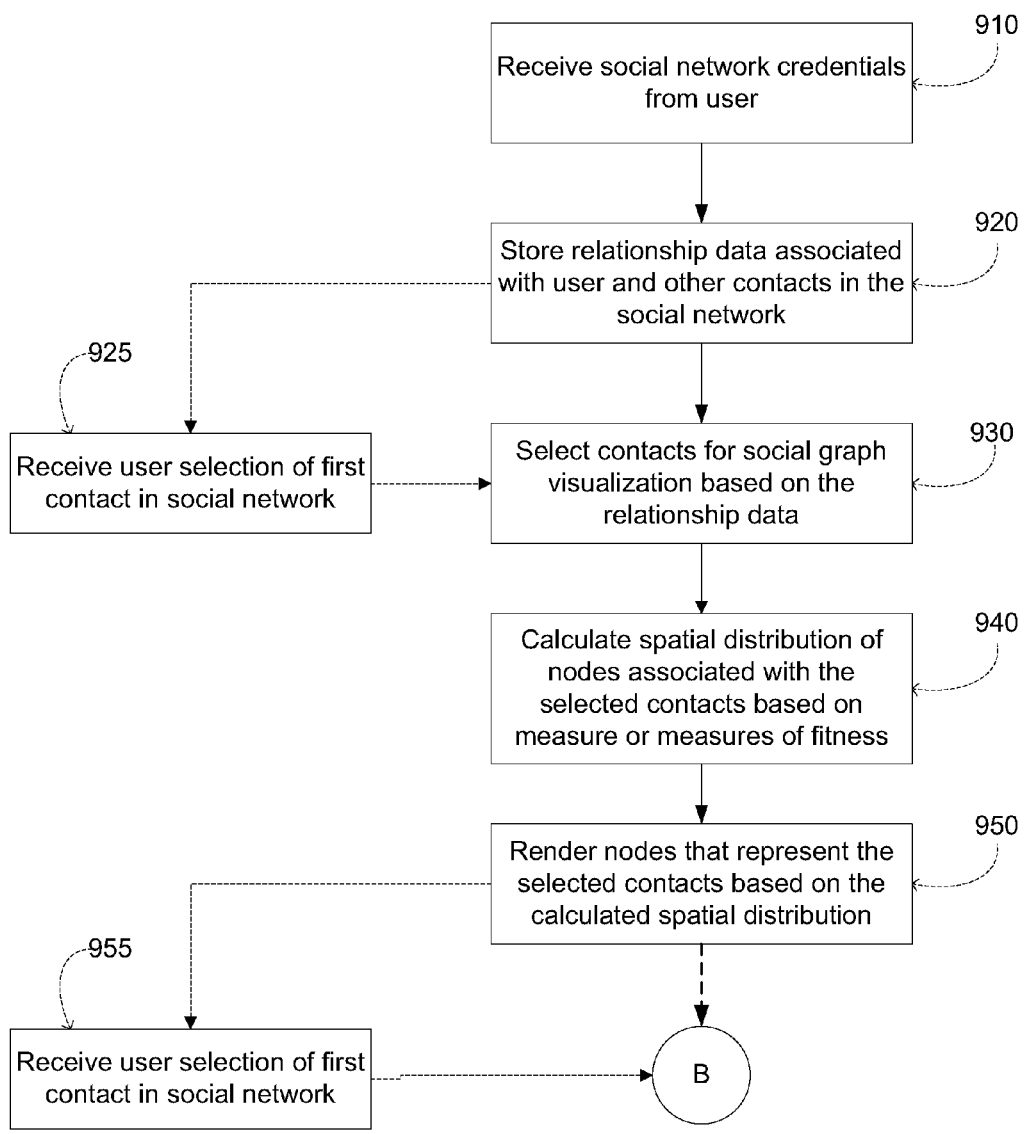
FIG. 9 shows an illustrative process for visualizing a social graph in accordance with one embodiment of the invention.

FIG. 9 shows an illustrative process 900 for visualizing a social graph in accordance with one embodiment of the invention. Process 900 begins at step 910. At step 910, social network credentials are received from a user. These social network credentials may be entered by the user using an input device of one or more user devices 116 (FIG. 1). For example, the user may enter their login credentials for Facebook, Twitter, LinkedIn, or any suitable web-based network community. In some embodiments, the network credentials may be entered by a user into a web page or form within an access application 102 (FIG. 1) running on the one or more user devices 116. For example, upon launching the access application 102 on an iPhone, access application 102 may prompt the user to enter their Facebook login credentials. The user may use the virtual keyboard within iOS to enter their login credentials for Facebook in response to the prompt, such as in a pop-up notification within iOS, or a form provided within access application 102 itself.

In such embodiments, the user may be prompted to approve whether the access application may download and store data associated with the login credentials for the social network. For example, after providing their Facebook credentials the user may be prompted to approve the download and storage of relationship data within the access application itself. In some embodiments, the relationship data may be stored on user devices 116 (e.g., flash memory, holographic memory, hard drives, solid state drives, or any suitable device storage hardware), data store 110 (FIG. 1), or any suitable data storage accessible by user devices 116. The relationship data that is stored may be associated with a user's list of friends, friends of those friends (i.e., second degree connections in the network community), friends of friends of friends (i.e. third degree connections in the network community), friends of friends of friends of friends (i.e. fourth degree connections in the network community, the connections between those friends, or any other data associated with relationships between the users and others in a network community. The user may indicate his or her approval to this prompt by, for example, selecting a button to indicate approval (e.g. a button that says "OK" or "I approve" within the user interface). After the user's approval is received, relationship data needed for the visualization may be downloaded from servers associated with the network community.

In some embodiments, the access application itself may have previously downloaded relationship data associated with one or more network communities before the user is prompted to enter their social network credentials. For example, the developer of the access application may deploy an automated script that crawls the servers of one or more network communities using publically available application programming interfaces associated with the one or more network communities. The information collected by the script may be stored in data storage associated with the access application, such as data store 110 (FIG. 1). In an embodiment, this data is securely protected until a user's network credentials are received. For example, once the access application authenticates the user's social network credentials, relationship data that was previously downloaded by the script may be made available for download to the user's mobile phone. This downloaded information may be subsequently used by the access application to render a visualization of a social graph associated with the network community or communities present in a social network (i.e., the social network associated with the social network credentials provided by the user).

It should be understood that more than one set of social network credentials may be received at step 910. For example, a user may provide their login credentials for both Facebook or LinkedIn. In some embodiments, process 900 may download and store data associated with these login credentials, and then render a visualization of a social graph based on the data. Once social network credentials are received from the user, process 900 proceeds to step 920

At step 920, relationship data associated with the user and other contacts in the social network are stored. In some embodiments, this relationship data may include degrees of separation between the user and other contacts in the social network. For example, the relationship data may include information associated with the degrees of separation between the user and other contacts in the social network. This information may include a listing of the contacts in the social network, and each contact may be associated with a degree of separation from the user. For example, the information may list the user's Facebook friends, and indicate that each is separated by one degree from the user. In addition, the information may list friends of the user's Facebook friends, and indicate that each is separated by two degrees from the user. In some embodiments, the relationship data may include information associated with contacts that are three degrees of separation from the user (i.e., friends of friends of friends), four degrees of separation from the user (i.e., friends of friends of friends of friends), or contacts that are any suitable number of degrees of separation from the user (e.g., 5, 6, 8, 10, or more degrees of separation from the user). The identity of the contacts may be stored in string names that are associated with the nodes that represent the contacts and stored in a table, such as table 502 (FIG. 5). Additionally, the degree of separation from the user may be stored as an integer as an additional entry in table 502.

In some embodiments, the relationship data may include connectivity information (e.g., one or more of connectivity values, trust scores, path weights, and path scores) associated with the user and other contacts in the social network. Connectivity may be determined, at least in part, using various graph traversal and normalization techniques described above, and in particular with respect to FIGS. 6A-E, FIG. 7, and FIG. 8. In some embodiments, this connectivity information may be stored in data structures as shown in FIGS. 4A-4C and FIGS. 5A and 5B. Once the relationship data associated with the user and other contacts in the social network are stored, process 900 proceeds to step 930, or optional step 925.

At optional step 925, a user may select a first contact in the social network. In embodiments where process 900 proceeds to optional step 925 after step 920, a list of contacts associated with the relationship data stored at step 920 may be provided to the user, and the user may select a first contact off the list. For example, a list of all of a user's Facebook friends may be provided to the user in an iOS list view, and the user can navigate through the list to select one of the friends. In an embodiment, the selected first contact may be associated with a "target" node in the visualization of the social graph. As will be discussed with respect to FIG. 13, the target node may be highlighted or colored differently from other nodes in the visualization of the social graph. In some embodiments, the resulting visualization may provide the user with information regarding a path between the user and the "target" node that has a high amount of connectivity in the path. Process 900 proceeds to step 930.

At step 930, contacts may be selected for the visualization of the social graph based on the relationship data stored at step 920. In an embodiment, these contacts may be automatically selected based on the relationship data. In some embodiments, the relationship data may include the degrees of separation between the user and other contacts in the social graph. In such embodiments, the contacts for the visualization of the social graph may be selected based on the degrees of separation between the user and others in the network community depicted by the social graph. For example, contacts may be selected that are four or less degrees of separation from the user. This means that in the social graph visualization, the rendered nodes will correspond to all friends, friends of friends, friends of friends of friends, and friends of friends of friends of friends of the user. In another example, the only contacts that may be selected are two degrees of separation from the user. This means that in the social graph visualization, the rendered nodes will correspond to friends of friends only. In embodiments where process 900 proceeds to optional step 925, nodes may be selected based on the relationship data as well as the selected "target" node. For example, contacts may be selected that are four or less degrees of separation from the user and the first contact. Selecting contacts based on the degrees of separation between both the user and a target node and other contacts in a social graph may result in a visualization of the social graph that is more focused on the nexus of contacts between the user and the target node. Such a visualization may be useful when a user wants to see what other contacts are shared with the target node.

In some embodiments, the relationship data may include connectivity information associated with the user and other contacts in the social network. In such embodiments, the contacts for the visualization of the social graph may be selected based on the degree of connectivity between the user and others in the network community depicted by the social graph. For example, trust scores may be calculated between the user and each of the contacts associated with the social graph, and the contacts that are selected for the visualization may be restricted to those that are within a particular threshold trust score. Process 900 may then proceed to step 940.

At step 940, a spatial distribution of nodes associated with the selected contacts may be calculated based on one or more measures of fitness. The spatial distribution of the nodes defines the layout of the nodes, and ultimately the edges connecting the nodes, in the visualization of a social graph. In an embodiment, in order to address the issue of performance to layout the nodes and edges of the graph, a spatial distribution is calculated such that nodes with different radii are approximately evenly positioned throughout the display of the visualization.

In an embodiment, a divide and conquer algorithm may be used along with genetic algorithm techniques in order to calculate the spatial layout of the nodes. An example of pseudo-code to provide such functionality is described below:

```
void divideNodesIntoQuadrants(Quadrant quadrant) {
    // If there is exactly one node, randomly place it in the rectangle
    if (quadrant.nodes.size( ) <= 1) {
        for (node : quadrant.nodes) {
            randomlyPlaceNodeInRect(node, quadrant.rectangle);
        }
    }
    else {
        Quadrant[ ] subquadrants =
            geneticSearchBestDistribution(quadrant);
        for (subquadrant : subquadrants) {
            if (!subquadrant.nodes.isEmpty( )) {
                divideNodesIntoQuadrants(subquadrant);
            }
        }
    }
}
void geneticSearchBestDistribution(Quadrant quadrant) {
    Quadrant[ ] subquadrants =
        splitIntoFourQuadrantsAndRandomlyDistributeNodes(quadrant);
    double currentFitness = calculateFitness(subquadrants);
    for (int generation = 0; generation < MAX_GENERATIONS;
         generation++) {
        Quadrant[ ] newSubquadrants = makeNextGeneration(subquadrants);
        double newFitness = calculateFitness(newSubquadrants);
        if (newFitness > currentFitness) {
            subquadrants = newSubquadrants;
            currentFitness = newFitness;
        }
    }
    return subquadrants;
}
```

In the above pseudo-code, the "divideNodesIntoQuadrants" function takes quadrants containing nodes as input. In an embodiment, the nodes given as input are the nodes associated with the contacts selected at step 930. If the quadrant contains more than one node, the function "geneticSearchBestDistribution" is called to divide the nodes in the quadrant into subquadrants using a genetic algorithm based on a measure of fitness. The "divideNodesIntoQuadrants" function is then called recursively on each of the subquadrants, effectively dividing the subquadrants into further subquadrants, until there are no more nodes in the subquadrants.

As mentioned above, the "geneticSearchBestDistribution" function divides nodes into subquadrants using a genetic algorithm based on a measure of fitness. Generations for the genetic algorithm are generated using the "makeNextGeneration" function. In an embodiment, the "makeNextGeneration" function calculates new generations by randomly selectingtwo nodes in different subquadrants and swapping them. A measure of fitness is calculated for each of the generations of subquadrants, and the fitness of the generations are compared. If a newly created generation of subquadrants has a greater level of fitness than a current generation of subquadrants, the newly created generation of subquadrants becomes the generation to which other newly created generations are compared. The "geneticSearchBestDistribution" function then returns the subquadrants with the highest level of fitness.

Within the "geneticSearchBestDistribution" function, the "calculateFitness" function calculates a measure of fitness for each generation of subquadrants. In an embodiment, the measure of fitness may be calculated by measuring the amount of area that the nodes in the generation of subquadrants occupy. In such embodiments, a lower measure of fitness may correspond to a higher measure of the amount of area that the nodes in the generation of subquadrants occupy. For example, the fitness function may be calculated based on the difference between the area in a proposed quadrant and the optimal area for a quadrant. Accordingly, a lower difference translates to a more desirable measure of fitness. In an embodiment, the optimal area for a quadrant may be predetermined as the area of all the nodes to be displayed in the visualization divided by four. When such a measure of fitness is used, the spatial distribution of nodes may be even with respect to the size of the nodes. In an embodiment, the measure of fitness may be calculated by calculating trust scores between the user and each of the nodes in a particular generation of subquadrants. A sum may then be calculated for all of the trust scores for the nodes in that particular generation of quadrants. In such embodiments, a higher measure of fitness may correspond to a higher sum of the trust scores. When such a measure of fitness is used, the spatial distribution of the nodes may be even with respect to the trust scores between the contacts associated with the nodes in the visualization. In an embodiment, the measure of fitness may be calculated by measuring all of the edges running through or present within a particular generation of subquadrants. In such embodiments, a higher measure of fitness may correspond to a higher measure of the edges running through or present in a particular generation of subquadrants. When such a measure of fitness is used, the spatial distribution of the nodes may be even with respect to the paths between the nodes in the visualization.

It shall be understood that in some embodiments, more than one measure of fitness is used to calculated the spatial distribution of the selected nodes in the visualization. For example, both the amount of area that the selected nodes occupy in the visualization and trust scores between the selected nodes and the user may be used to calculate the spatial distribution of the nodes. Once the spatial distribution of nodes associated with the selected contacts is calculated based on a measure of measures of fitness, process 900 proceeds to step 950.

At step 950, the nodes that represent the selected contacts are rendered based on the calculated spatial distribution. In an embodiment, the spatial distribution is the same one calculated according to the "divideNodesIntoQuadrants" function described with respect to step 940. In an embodiment, connectivity or trust scores may be calculated between a node representing the user and each of the rendered nodes. These connectivity or trust scores may be calculated by, for example, the techniques described with respect to FIG. 8. In such embodiments, the radius of each node may be rendered based on the trust score out of the calculated trust scores that is associated with that node. In some embodiments, the radius of the rendered nodes may be directly proportional to the trust score associated with that node. In an embodiment, the radius of each node may be rendered based on the degree of separation between the contact associated with the node and the user. In such embodiments, the radius of each node may be directly proportional to the logarithm of the degree of separation between the contact associated with the node and the user. In an embodiment, the radius of each node may be rendered based on the amount of edges going into and out of a given node. In such embodiments, the radius of each node may be directly proportional to the sum of the number of outgoing edges and incoming edges associated with that node.

In an embodiment, the user can change the view of the rendered nodes by, for example, zooming in, zooming out, or panning around the visualization of the social graph. For example, in embodiments where the user interacts with the rendered nodes using a multi-touch interface, the user may use a two-finger "pinch" gesture to zoom into a particular area of the social graph. Process 900 optionally proceeds to step 955, or ends.

At optional step 955, a user selection of a first contact in the social network is received. Optional step 955 is substantially similar to optional step 925, except that the user may select the contact by interacting with the nodes rendered at step 950. For example, a user may interact with the rendered nodes using a multi-touch interface, and may select one of the rendered nodes as a "target" node by touching their finger to the portion of the multi-touch interface on which the desired "target" node is rendered.

Figure 10:
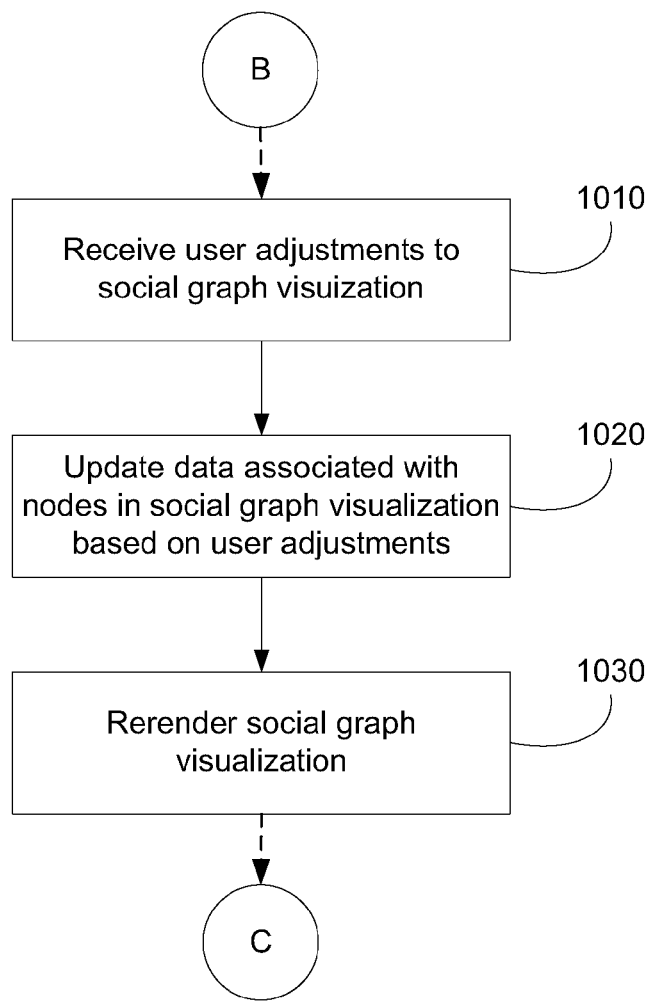
FIG. 10 shows an illustrative process for adjusting a visualization of a social graph in accordance with one embodiment of the invention.

FIG. 10 shows an illustrative process 1000 for adjusting a visualization of a social graph in accordance with one embodiment of the invention. Process 1000 begins at step 1010. In some embodiments, step 1010 may be executed following step 950 or optional step 955 of process 900. At step 1010, user adjustments to the social graph visualization are received. In some embodiments, the user adjustments may be to the size of the rendered nodes. In such embodiments, the user may input a multi-touch gesture in order to adjust the size of a node in the social graph visualization. For example, the user may place two fingers along the outline of a rendered node in the social graph visualization, and move the two fingers outward from the center of the rendered node, in order to increase the size of the rendered node. In an embodiment, the user may adjust the size of the rendered node by inputting a number conveying how large they would like a particular node to be. In an embodiment, the user adjustments may be the addition or deletion of nodes in the social graph visualization. In one example example, a user may indicate that they wish to remove a node from the social graph visualization. In another example, a user may indicate that they wish to add a node to the social graph visualization. For example, a user may meet a person at a cocktail party that they are not yet friends with on Facebook or connected to on LinkedIn. The user may then indicate that they wish to add a user to the social graph visualization by, for example, searching for the person using the access application that is rendering the social graph visualization. The search may query a database associated with one or more social networks in order to locate relationship data associated with the person. Once relationship data associated with the person is located, the user may indicate that they wish to add the person to the social graph visualization. In an embodiment, the user adjustments may be to the placement of the nodes in the social graph. For example, a user may decide the spatial distribution of nodes in the visualization of the social graph is less than optimal (e.g., due to the automatic calculation of the spatial distribution in step 940 (FIG. 9)). The user may then drag and drop the nodes within the visualization of the social graph using any suitable input techniques, such as multi-touch gestures or through the use of a mouse. Process 1000 proceeds to step 1020

At step 1020, data associated with the nodes in the social graph visualization are updated based on the user adjustments. In one example, if the size of a node has been adjusted, a corresponding value in a table of connectivity data associated with that node (e.g., the tables shown with respect to FIG. 5A) may increase or decrease. In another example, if a node has been removed from a social graph visualization, tables of connectivity data associated with that node may be deleted. In a final example, if a node has been moved within a social graph visualization, data associated with the rendering of that node (e.g., data associated with a bitmap) may be updated. Process 1000 proceeds to step 1030.

Figure 11:
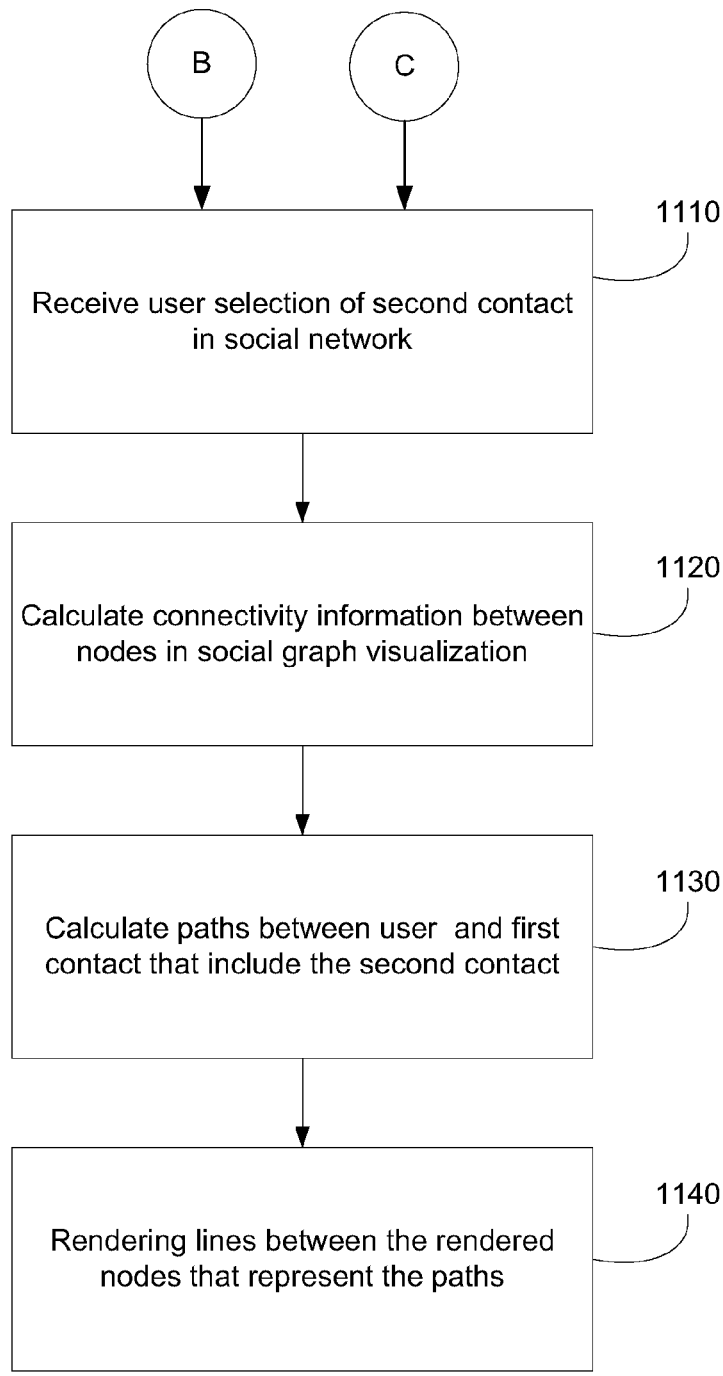
FIG. 11 shows an illustrative process for visualizing a social graph in accordance with one embodiment of the invention.

At step 1030, the social graph visualization is rerendered based on the user adjustments. In an embodiment, the rerendering may take into account any changes in node sizes, node additions or deletions, or node placement to the visualization of the social graph. Process 1000 then ends FIG. 11 shows an illustrative process 1100 for visualizing a social graph in accordance with one embodiment of the invention. Process 1100 provides a method for visualizing one or more paths among the rendered nodes in the social graph such that the edges in the paths do not overwhelm, or "black out", the screen. In order to solve this problem, process 1100 provides the user with an opportunity for the user to select a first and second node associated with first and second contacts in one or more social networks. The first contact selected may be a "target" node in that the visualization will display paths starting with the user and ending at the first contact. The second contact selected may be a "intermediate node" in that the visualization will display paths starting with the user and ending at the first contact (i.e., the "target" node selected at optional step 925 or optional step 955) that include a node representing the second contact. Process 1100 starts at step 1110. At step 1110, a user selection of a second contact in a social network may be received. The user selection of the second contact may be substantially similar to any of the selection processes described with respect to optional step 925 and optional step 955 (FIG. 9). For example, a user may use a multi-touch gesture to select a node representing the second contact among a set of nodes rendered as described with respect to step 950 of process 900 (FIG. 9) or step 1030 of process 1000 (FIG. 10). It shall be understood that more than one contact may be selected at step 1120. For example, a user may select three contacts as "intermediate" nodes in the social graph visualization. The visualization may then display paths starting with the user and ending with the first contact that include nodes representing the three contacts. Process 1100 proceeds to step 1120.

At step 1120, connectivity information may be calculated between each node in the social graph visualization. In an embodiment, connectivity or trust scores may be calculated between each of the nodes rendered at step 950 of process 900 (FIG. 9), step 1030 of process 1000 (FIG. 10), or both. In an embodiment, connectivity or trust scores may be calculated only between some of these nodes. For example, trust scores may be calculated only between a node associated with a user of the social graph visualization (i.e., a user of the access application rendering the social graph visualization) and the rendered nodes of the social graph visualization. In an embodiment, these connectivity or trust scores may be calculated substantially similar to the process described with respect to FIG. 8. Process 1100 proceeds to step 1130.

At step 1130, paths between the user and the first contact that include the second contact are calculated. In an embodiment, all paths between the user and the first node that include the second node are calculated. These paths may be calculated substantially similar to how all paths between a group of querying target nodes may be calculated as described with respect to process 720 (FIG. 7). In an embodiment, the calculations of paths may take into account the connectivity information calculated between the nodes at step 1120.

In an embodiment, once all paths between the user and the first node that include the second node are calculated, the "shortest path" may be calculated from the paths. In an embodiment, the "shortest path" may be defined as the path that provides the largest overall measure of connectivity in the weights of the edges along the path. In such embodiments, path scores may be calculated for each of the paths between the user and the first node that include the second node. The path scores for each respective path may then be sorted through one or more comparisons of the magnitude of the path scores, and the path with the highest path score may be designated the "shortest path" between the user and the first node that includes the target node. In an embodiment, the path scores are calculated according to equation (8) described above. In an embodiment, the path scores are calculated according to equations (9) to (11). Process 1100 proceeds to step 1140.

At step 1140, lines are rendered that represent the paths that were calculated at step 1130. In an embodiment, all paths calculated at step 1130 are rendered. Such an embodiment may be useful when there is a small number of nodes in the visualization of the social graph, or when the rendered paths result in a limited number of edge crossings (e.g., a number of edge crossings such that portions of the screen are not overrun by edges such that they "black out" the individual edges or other nodes). In an embodiment, only the shortest path calculated as described with respect to step 1130 is rendered. Process 1100 then ends.

Figure 12:
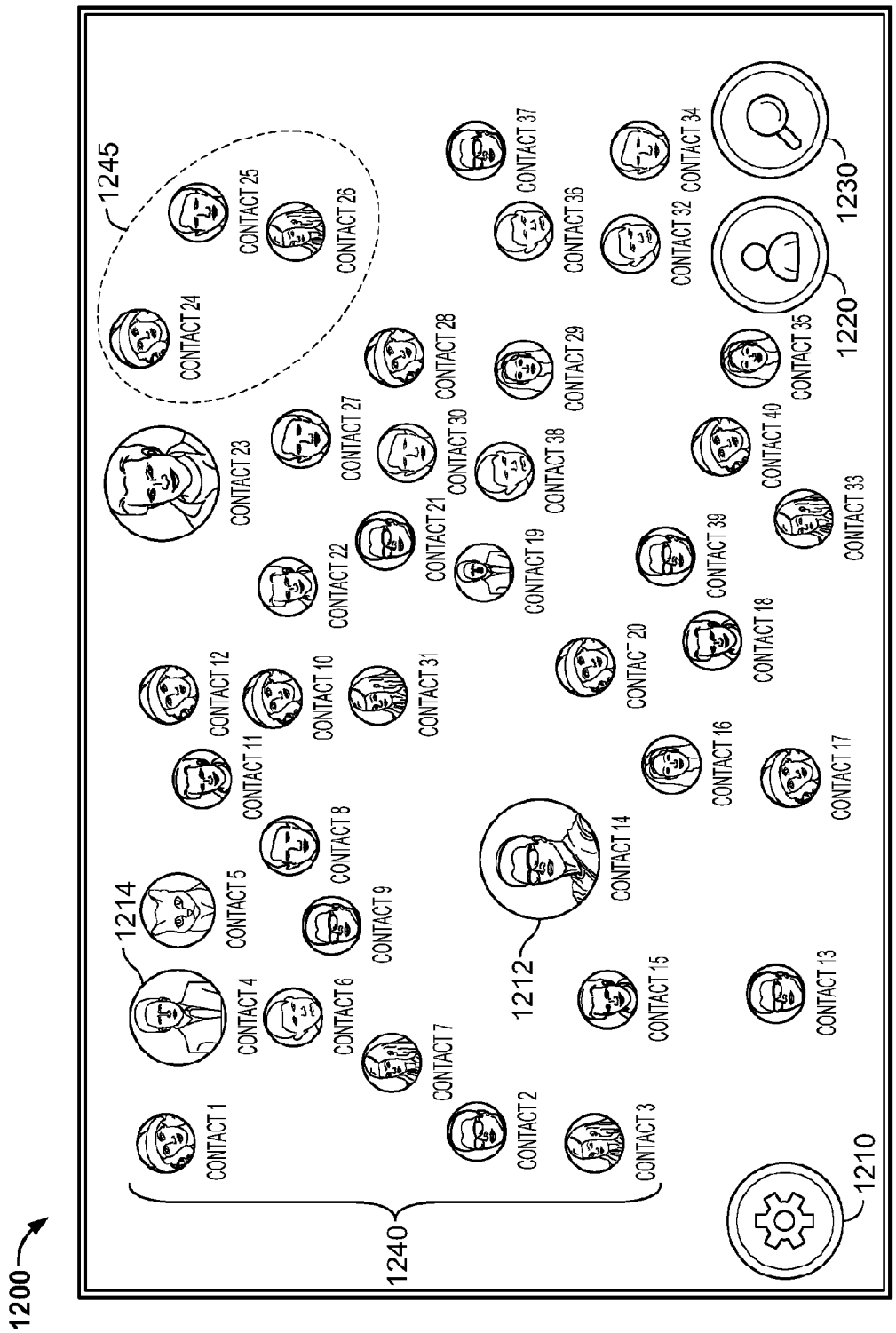
FIG. 12 shows an exemplary visualization of a social graph.

FIG. 12 shows an exemplary visualization 1200 of a social graph. In an embodiment, visualization 1200 may be presented on a display screen of one or more user devices 116 (FIG. 1). For example, visualization 1200 may be presented on the display screen of an iOS device Visualization 1200 may include options button 1210, contact directory button 1220, and contact search button 1230. When a user selects options button 1210, an options screen (not shown) may be displayed. The options screen may allow the user to enter social network credentials, such as login credentials for social networks like Facebook, Twitter, or LinkedIn. The social network credentials entered in the options screen may then be used to retrieve and store relationship data associated with the user and other contacts in the social network as described with respect to step 920 (FIG. 9). When a user selects contact directory button 1220, a screen may be displayed that shows a list of contacts in one or more social networks. In an embodiment, this list may allow a user to select a first network contact associated with a "target" node as described with respect to optional step 925 or optional step 955 (FIG. 9). In an embodiment, this list may allow a user to select a second contact associated with an "intermediate" node as described with respect to step 1110 (FIG. 11). When a user selects contact search button 1210, a screen may be displayed that allows a user to enter the name of a contact to search for in one or more social networks. For example, a user may conduct a search across both Twitter and LinkedIn a contact named "John Smith". In an embodiment, the user may select the contact that was found as a first contact associated with a "target" node as described with respect to optional step 925 or optional step 955, or may select the contact as a second contact associated with an "intermediate" node as described with respect to step 1110 (FIG. 11). In an embodiment, the user may select the contact that was found as a node that they wish to add to the visualization of the social graph as described with respect to step 1010 (FIG. 10).

Visualization 1200 also may include contacts 1240. As shown, contacts 1240 include 40 contacts associated with one or more social networks. Each of contacts 1240 represents a node within the visualization of the social graph In an embodiment, these contacts may be illustrated as circles containing profile photos associated with the contacts, such as Facebook or Twitter profile photos. Although contacts 1240 are illustrated as human beings (contacts 1-4 and 6-40) and a cat (contact 5), it shall be understood that contacts 1240 may also represent entities (e.g., a legal entity, such as a public or private company, corporation, limited liability company (LLC), partnership, sole proprietorship, or charitable organization), concepts (e.g., a social networking group), services, cities/towns/villages, parcels of land (which may be identified by land descriptions), or inanimate objects (e.g., a car, aircraft, or tool).

In an embodiment, contacts 1240 are selected based on relationship data as described with respect to step 930 of process 900 (FIG. 9). In an embodiment, the spatial distribution of contacts 1240 may be based on a calculated spatial distribution as described with respect to step 940 of process 900 (FIG. 9). In an embodiment, rendering of contacts 1240 may be performed as described with respect to step 950 of process 900 (FIG. 9). In an embodiment, the visualization of contacts 1240 may be adjusted as described with respect to steps 1010, 1020, and 1030 of process 1000 (FIG. 10).

Visualization 1200 also includes user node 1212. In an embodiment, user node 1212 represents the user of an access application 102 (FIG. 1) that is rendering visualization 1200. Visualization 1200 also include first selected node 1214. First selected node 1214 represents the first contact selected by the user—i.e., the node that the user wishes to be a "target" node in visualization 1200. Visualization 1200 also includes identified community 1245. Identified community 1245 may represent a subcommunity or subgroup with visualization 1200. For example, the contacts within identified community 1245 may be members of the same professional organization. In an embodiment, identified community 1245 is determined based on relationship data associated with the contacts depicted by the nodes of identified community 1245. As shown, identified community 1245 is grouped closely together within visualization 1200. In an embodiment, the appearance of the nodes within identified community 1245 is different from the nodes depicting other contacts in visualization 1200. For example, the outline of nodes within identified community 1245 may be colored differently than the outline of other nodes in visualization 1200.

Figure 13:
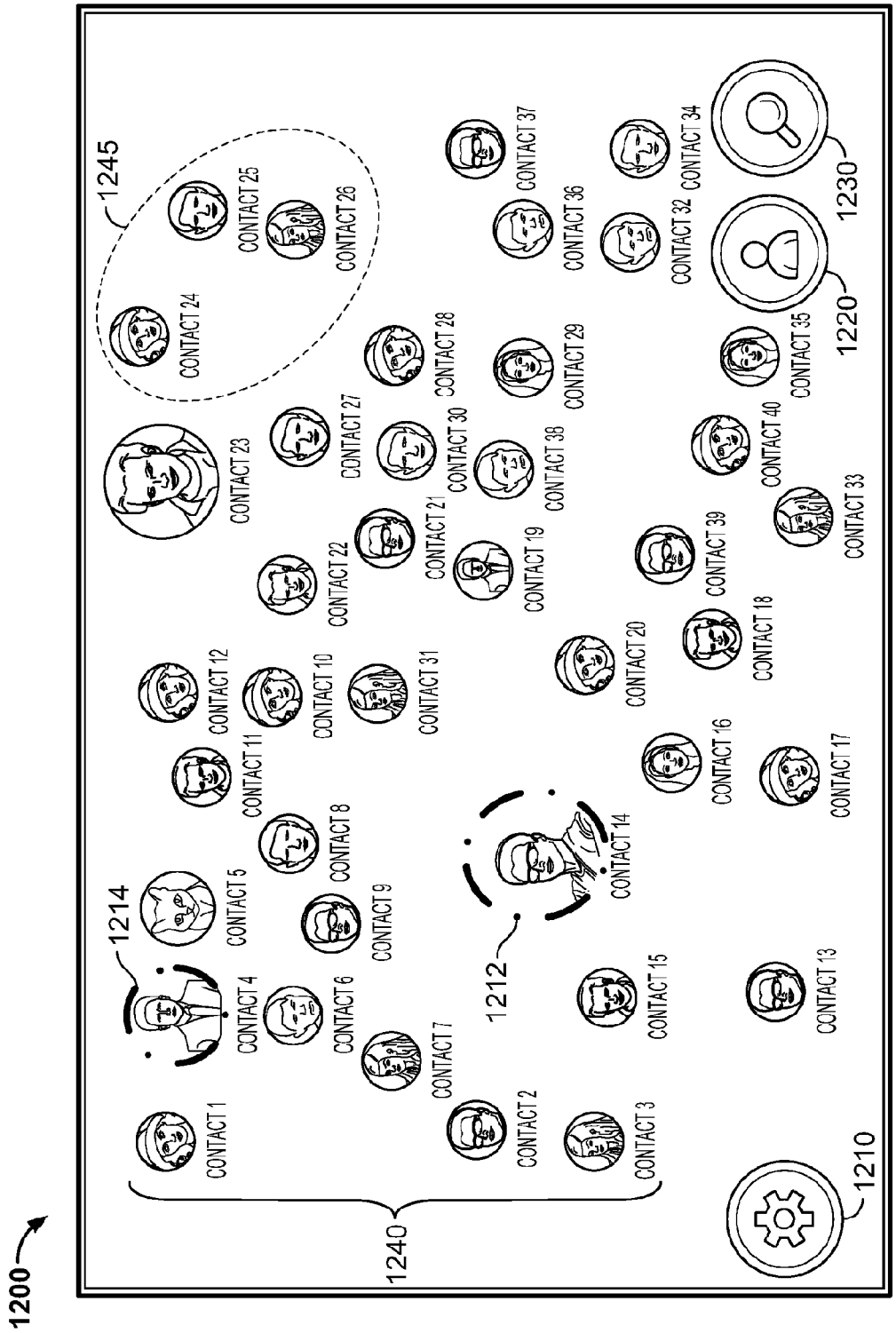
FIG. 13 shows an additional view of the exemplary visualization of a social graph.

FIG. 13 shows an additional view of exemplary visualization 1200 of a social graph. This additional view may be displayed after a user selects a first contact as a "target" node in visualization 1200 (e.g., as described with respect to optional step 925 and 955 of process 900). In this additional view, user node 1212 and first selected node 1214 are highlighted differently than nodes representing other contacts 1240 in visualization 1200. Such highlighting allows the user to track of the location of the node representing himself or herself, as well as the node representing the first contact he or she selected.

Figure 14:
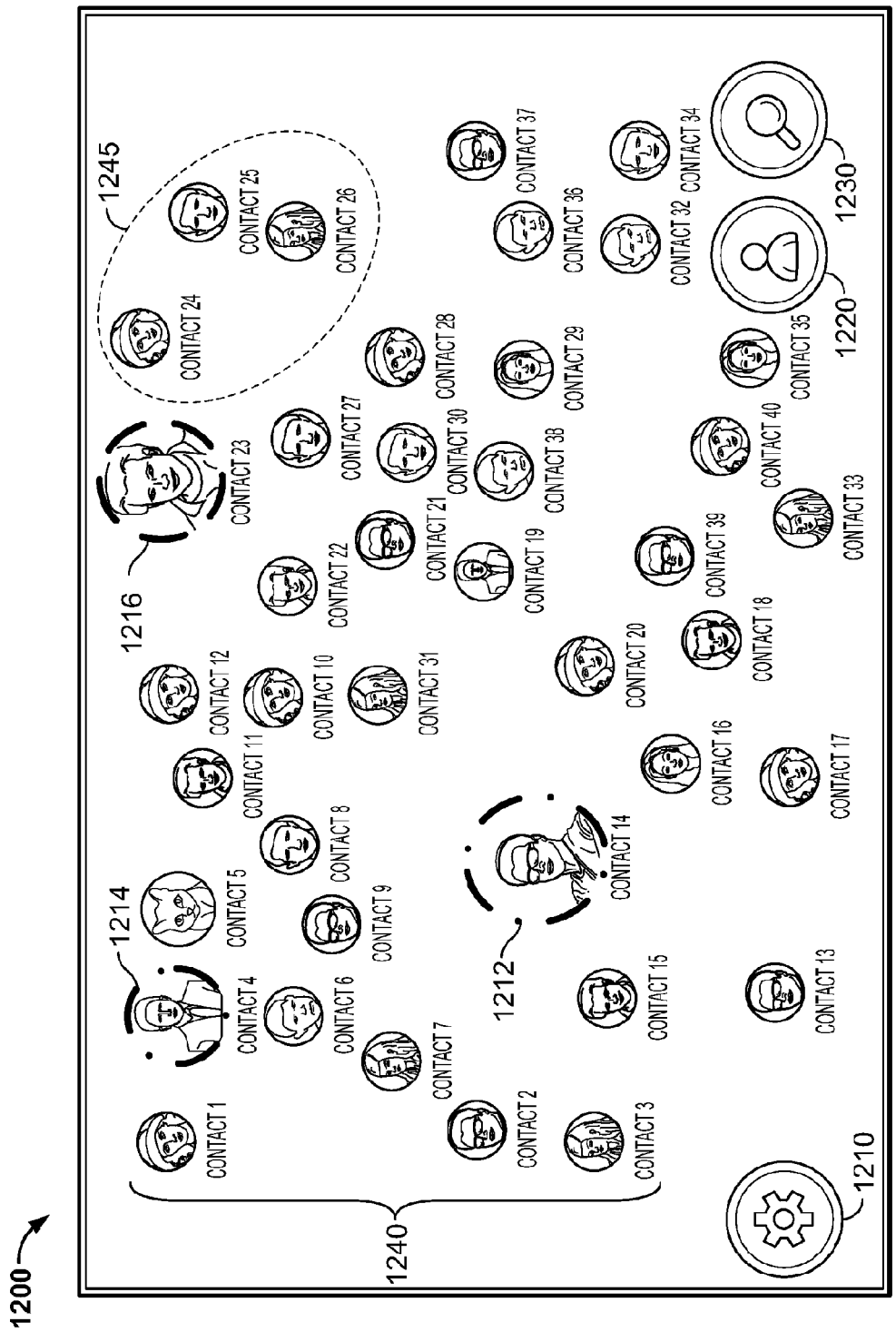
FIG. 14 shows an additional view of the exemplary visualization of a social graph.

FIG. 14 shows an additional view of exemplary visualization 1200 of a social graph. This additional view may be displayed after a user selects a second contact as an "intermediate" node as described with respect to step 1110 of process 1100 (FIG. 11). In this additional view, second selected node 1216 is highlighted differently than the highlighting of user node 1212 and first selected node 1214. Such highlighting allows the user to track the location of user node 1212, first selected node 1214, and second selected node 1216 before a path is drawn between these three nodes.

Figure 15:
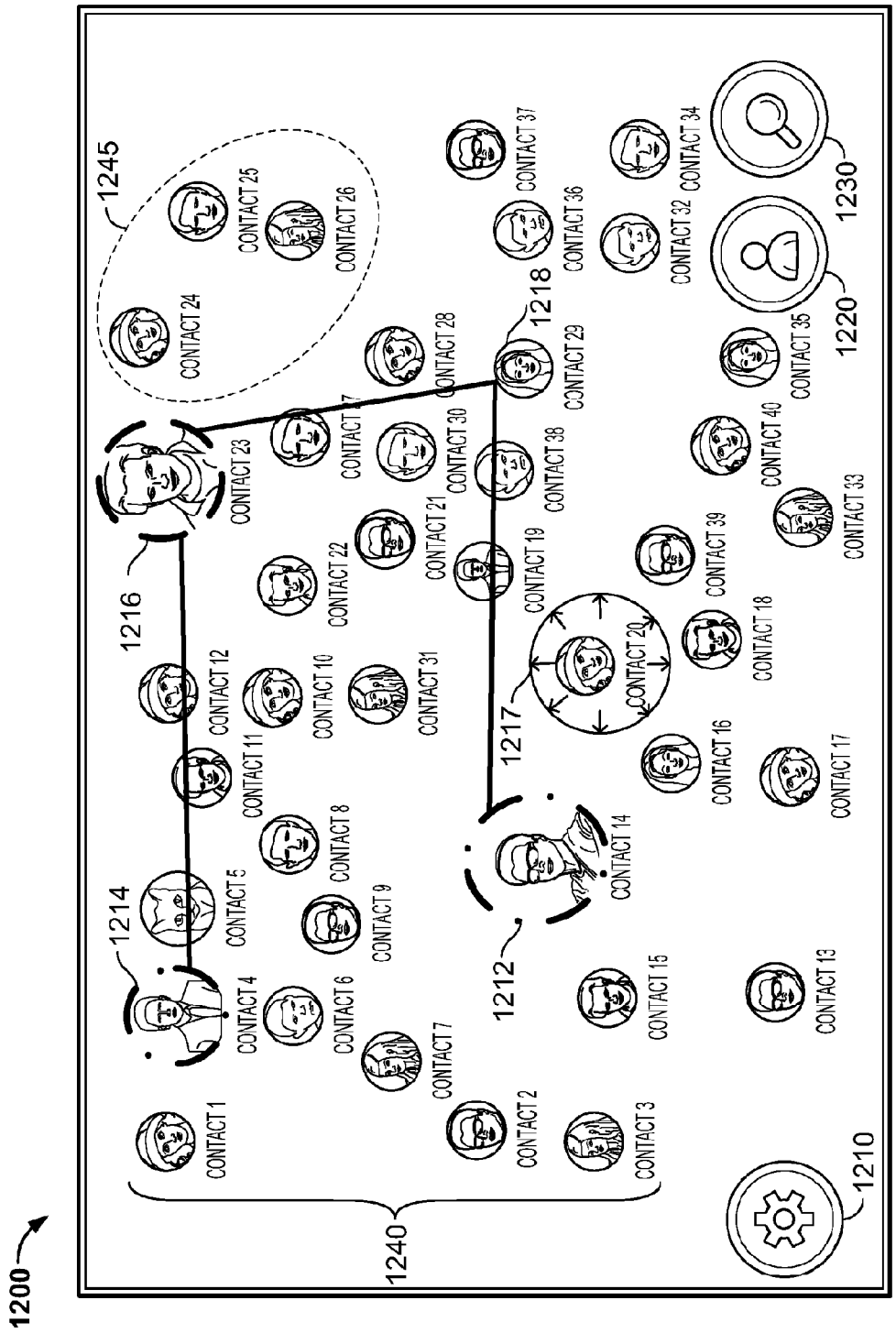
FIG. 15 shows an additional view of the exemplary visualization of a social graph.

FIG. 15 shows an additional view of exemplary visualization 1200 of a social graph. This additional view may be displayed after steps 1110, 1120, 1130, and 1140 are executed by process 1100 (FIG. 11). In this additional view, a path is rendered between user node 1212 and first selected node 1214 that includes second selected node 1216. As shown, the rendered path also includes node 1218. In an embodiment, the rendered path represents a "shortest path" between user node 1212 and first selected node 1214 that includes second selected node 1216.

FIG. 15 also shows an adjustment to node 1217. As shown, a user has selected and increased the size of node 1217. This adjustment to node 1217 may occur as described with respect to step 1010 of process 1000 (FIG. 10). As a result of this adjustment, data associated with node 1217 may be updated as described with respect to step 1020 of process 1000 (FIG. 10), and visualization 1200 may be rerendered as described with respect to step 1030 of process 1000 (FIG. 10).

The above described embodiments of the invention are presented for purposes of illustration and not of limitation. The following claims give additional embodiments of the present invention.

What is claimed is:

1. A method for rendering a visualization of a social graph, wherein the visualization represents relationship data between a user and at least two other contacts in the social graph, the method comprising:
    receiving, by a device comprising a processor and from a second device of a user, social network credentials associated with the user based upon an input of the user into the second device;
    storing, in a memory of the device, relationship data associated with the user and the at least two other contacts in the social network based on the social network credentials, wherein the at least two other contacts are indicated via an input through a display of the visualization of the social graph on the second device;
    selecting, by the device, selected contacts from a group of contacts for the visualization of the social graph based on the relationship data;
    determining, by the processor, trust scores between the user and selected nodes representing the selected contacts based on an indication of trust in a user profile;
    based on at least one measure of fitness, calculating, by the processor, a spatial distribution of the selected nodes to visually communicate to the user the at least one measure of fitness, wherein the at least one measure of fitness comprises the determined trust scores;
    rendering, via a display of the device, the selected nodes based on the calculated spatial distribution;
    receiving, by the device and from the second device, at least one user adjustment to the spatial distribution; and
    updating, in the memory, at least a portion of the relationship data based upon the user adjustment.

2. The method of claim 1, wherein the relationship data comprises degrees of separation between the user and the at least two other contacts.

3. The method of claim 2, further comprising:
    receiving, by the device, a user selection of a first contact in the social network; and selecting, by the device, contacts for the visualization of the social graph based on the degrees of separations between the user and the first contact.

4. The method of claim 3, wherein selecting contacts for the visualization of the social graph based on degrees of separation from the user and the first contact comprises only selecting those contacts that are within four degrees of separation from the user and the first contact.

5. The method of claim 2, wherein a portion of the at least two other contacts in the social network are within two or more degrees of separation from the user and a first contact.

6. The method of claim 1, wherein calculating the spatial distribution of the nodes associated with the selected contacts based on at least one measure of fitness further comprises calculating the amount of area the selected nodes occupy in the visualization of the social graph.

7. The method of claim 1, further comprising:
calculating, by the device, trust scores between a node representing the user and each of the rendered nodes; and
for each node, rendering, by the device, the radius of that node based on a trust score of the calculated trust scores associated with that node.

8. The method of claim 7, wherein the length of each radius is directly proportional to the trust score of the calculated trust scores associated with that node.

9. The method of claim 1, further comprising allowing, by the device, the user to adjust the size of one of the rendered nodes.

10. The method of claim 9, further comprising updating, by the device, the relationship data associated with the contact represented by the one of the rendered nodes.

11. The method of claim 10, further comprising increasing or decreasing, by the device, trust scores associated with the one of the rendered nodes based on the adjustment in the size.

12. The method of claim 1, further comprising:
receiving, by the device, a user selection of a first and second contact in the social network;
calculating, by the device, the shortest path between the user and the first selected contact that includes the second selected contact based on the trust scores; and
rendering, via the display of the device, lines between the rendered nodes that represent the calculated shortest path.

13. The method of claim 12, wherein calculating the shortest path further comprises calculating path scores for each of the paths between the user and the first selected contact that includes the second selected contact.

14. The method of claim 12, wherein calculating the shortest path between the user and the first selected contact that includes the second selected contact comprises:
for each path, calculating a pathscore according to the equation $$PathScore(path) = g(path) * \prod_{edge \in path} f(w_{edge}),$$

wherein $w_{edge}$ is associated with a trust score between two nodes in the path, $f(w)$ is defined according to the function $$f(w) = \begin{cases} 4, \text{ if } w < 0.2 \\ 2, \text{ if } 0.2 \leq w < 0.4 \\ 1, \text{ if } 0.4 \leq w < 0.8 \\ 2 \text{ if } 0.8 \leq w < 1.0 \\ 4, \text{ if } w = 1.0 \end{cases}$$

and g(path) is defined according to the function $$g(path) = \begin{cases} -1, \exists\ w_{edge} < .6 \\ 1, \text{ otherwise} \end{cases}.$$

15. The method of claim 1, further comprising:
receiving, by the device, a user selection of a first and second contact in the social network;
calculating, by the device, paths between a node associated with the user and a node associated with the second contact that include a node associated with the second selected contact; and
rendering, via the display of the device, the calculated paths between the rendered nodes.

16. The method of claim 15, further comprising rendering, by the device, the radius of each node based on the calculated paths.

17. The method of claim 16, wherein the calculated paths comprise a plurality of outgoing edges and a plurality of incoming edges associated with each node.

18. The method of claim 1, further comprising:
receiving, by the device, at least one contact to add to the visualization of the social graph;
recalculating, by the device, the spatial distribution of nodes associated with the selected contacts and the at least one contact; and
rerendering, via the display of the device, the visualization of the social graph based on the recalculated spatial distribution.

19. A network server for rendering a visualization of a social graph on a display device, wherein the visualization represents relationship data between a user and at least two other contacts in the social graph, the network server comprising processing circuitry comprising a microprocessor configured to:
receive social network credentials associated with the user from a second device of the user based upon an input of the user into the second device;
store in a memory of the network server relationship data associated with the user and the at least two other contacts in the social network based on the social network credentials, wherein the at least two other contacts are indicated via an input through a display of the visualization of the social graph on the second device;
select using the processor selected contacts from a group of contacts for the visualization of the social graph based on the relationship data;
determine by the processor a trust score between the user and selected nodes representing the selected contacts based on an indication of trust in a user profile;
based on at least one measure of fitness, calculate by the processor a spatial distribution of the selected nodes to visually indicate to the user the at least one measure of fitness, wherein the at least one measure of fitness comprises the trust score;

cause to be rendered using a display of the second device the selected nodes based on the calculated spatial distribution;
receive from the second device, at least one user adjustment to the spatial distribution; and
update, in the memory, at least a portion of the relationship data based upon the user adjustment.

20. The network server of claim 19, wherein the relationship data comprises degrees of separation between the user and the at least two other contacts.

21. The network server of claim 20, wherein the processing circuitry is further configured to:
receive a user selection of a first contact in the social network; and
select contacts for the visualization of the social graph based on the degrees of separations between the user and the first contact.

22. The network server of claim 21, wherein the processing circuitry is configured to select contacts for the visualization of the social graph based on degrees of separation from the user and the first contact by only selecting those contacts that are within four degrees of separation from the user and the first contact.

23. The network server of claim 20, wherein a portion of the at least two other contacts in the social network are within two or more degrees of separation from the user and a first contact.

24. The network server of claim 19, wherein the processing circuitry is configured to calculate the spatial distribution of the nodes associated with the selected contacts based on at least one measure of fitness by calculating the amount of area the selected nodes occupy in the visualization of the social graph.

25. The network server of claim 19, wherein the processing circuitry is further configured to:
calculate trust scores between a node representing the user and each of the rendered nodes; and
for each node, render the radius of that node based on a trust score of the calculated trust scores associated with that node.

26. The network server of claim 25, wherein the length of each radius is directly proportional to the trust score of the calculated trust scores associated with that node.

27. The network server of claim 19, wherein the processing circuitry is further configured to allow the user to adjust the size of one of the rendered nodes.

28. The network server of claim 27, wherein the processing circuitry is further configured to update the relationship data associated with the contact represented by the one of the rendered nodes.

29. The network server of claim 28, wherein the processing circuitry is further configured to increase or decrease trust scores associated with the one of the rendered nodes based on the adjustment in the size.

30. The network server of claim 19, wherein the processing circuitry is further configured to:
receive a user selection of a first and second contact in the social network;
calculate trust scores between each of the rendered nodes;
calculate the shortest path between the user and the first selected contact that includes the second selected contact based on the calculated trust scores; and
render lines between the rendered nodes that represent the calculated shortest path.

31. The network server of claim 30, wherein the processing circuitry is configured to calculate the shortest path further by calculating path scores for each of the paths between the user and the first selected contact that includes the second selected contact.

32. The network server of claim 31, wherein the processing circuitry is further configured to calculate the shortest path between the user and the first selected contact that includes the second selected contact by:
for each path, calculating a pathscore according to the equation $$PathScore(\text{path}) = g(\text{path}) * \prod_{edge \in path} f(w_{edge}),$$

wherein $w_{edge}$ is associated with a trust score between two nodes in the path, $f(w)$ is defined according to the function $$f(w) = \begin{cases} 4, \text{ if } w < 0.2 \\ 2, \text{ if } 0.2 \leq w < 0.4 \\ 1, \text{ if } 0.4 \leq w < 0.8 \\ 2 \text{ if } 0.8 \leq w < 1.0 \\ 4, \text{ if } w = 1.0 \end{cases}$$

and g(path) is defined according to the function $$g(\text{path}) = \begin{cases} -1, \exists\ w_{edge} < .6 \\ 1, \text{otherwise} \end{cases}.$$

33. The network server of claim 19, wherein the processing circuitry is further configured to:
receive a user selection of a first and second contact in the social network;
calculate paths between a node associated with the user and a node associated with the second contact that include a node associated with the second selected contact; and
render the calculated paths between the rendered nodes.

34. The network server of claim 33, wherein the processing circuitry is further configured to render the radius of each node based on the calculated paths.

35. The network server of claim 34, wherein the calculated paths comprise a plurality of outgoing edges and a plurality of incoming edges associated with each node.

36. The network server of claim 19, wherein the processing circuitry is further configured to:
receive at least one contact to add to the visualization of the social graph;
recalculate the spatial distribution of nodes associated with the selected contacts and the at least one contact; and
rerender the visualization of the social graph based on the recalculated spatial distribution.

* * * * *